(12) United States Patent
Kuri

(10) Patent No.: US 9,823,129 B2
(45) Date of Patent: Nov. 21, 2017

(54) SPECTROMETRY DEVICE, IMAGE FORMING APPARATUS, AND SPECTROMETRY METHOD

(71) Applicant: Seiko Epson Corporation, Tokyo (JP)

(72) Inventor: Ryohei Kuri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/058,527

(22) Filed: Mar. 2, 2016

(65) Prior Publication Data
US 2016/0258813 A1   Sep. 8, 2016

(30) Foreign Application Priority Data

Mar. 3, 2015 (JP) ................................. 2015-041728
Feb. 4, 2016 (JP) ................................. 2016-020034

(51) Int. Cl.
*G01J 3/26* (2006.01)
*G01J 3/28* (2006.01)
(Continued)

(52) U.S. Cl.
CPC .......... *G01J 3/2823* (2013.01); *G01J 3/0229* (2013.01); *G01J 3/06* (2013.01); *G01J 3/26* (2013.01);
(Continued)

(58) Field of Classification Search
CPC ........ G01J 3/28; G01J 3/02; G01J 3/06; G01J 3/33; G01J 3/10
See application file for complete search history.

(56) References Cited

U.S. PATENT DOCUMENTS

| | | | |
|---|---|---|---|
| 8,801,141 B2 | 8/2014 | Eiyama | |
| 2002/0109841 A1* | 8/2002 | Gould | G01J 3/02 356/318 |

(Continued)

FOREIGN PATENT DOCUMENTS

| | | |
|---|---|---|
| CN | 104034418 A | 9/2014 |
| EP | 2642741 A2 | 9/2013 |

(Continued)

OTHER PUBLICATIONS

Extended European Search Report for Patent Application No. EP16158009.7 dated Jul. 29, 2016 (11 pages).

*Primary Examiner* — Abdullahi Nur
(74) *Attorney, Agent, or Firm* — Harness, Dickey & Pierce, P.L.C.

(57) ABSTRACT

A printer includes a spectroscope and a carriage moving unit. The spectroscope includes a wavelength-selective interference filter on which light from a measurement target is incident, and the carriage moving unit moves the spectroscope in an X direction with respect to the measurement target. If the measurement target is a color patch, the spectroscope performs spectrometry by changing a wavelength of light passing through the wavelength-selective interference filter in a first period during which the spectroscope is moved in the X direction, and passes light of an initial wavelength through the wavelength-selective interference filter at a start of measurement and at an end of measurement in the first period. A first output value that is a measured value from the spectrometry at the start of measurement is compared with a second output value that is a measured value from the spectrometry at the end of measurement.

20 Claims, 17 Drawing Sheets

(51) Int. Cl.
    *G01J 3/50*            (2006.01)
    *H04N 1/60*          (2006.01)
    *G01J 3/02*            (2006.01)
    *G01J 3/06*            (2006.01)

(52) U.S. Cl.
    CPC .............. *G01J 3/50* (2013.01); *H04N 1/6033* (2013.01); *H04N 1/6044* (2013.01); *G01J 2003/061* (2013.01)

(56) References Cited

U.S. PATENT DOCUMENTS

| | | |
|---|---|---|
| 2002/0191188 A1 | 12/2002 | Hubble, III et al. |
| 2002/0191189 A1 | 12/2002 | Mestha et al. |
| 2003/0142314 A1 | 7/2003 | Hubble, III et al. |
| 2006/0132781 A1 | 6/2006 | Imura |
| 2006/0164657 A1* | 7/2006 | Chalmers ........... G01B 11/0625 356/630 |
| 2013/0308134 A1 | 11/2013 | Hirokubo |
| 2014/0253924 A1 | 9/2014 | Sano |

FOREIGN PATENT DOCUMENTS

| | | |
|---|---|---|
| EP | 2775276 A1 | 9/2014 |
| JP | 2002-345760 A | 12/2002 |
| JP | 2002-365139 A | 12/2002 |
| JP | 2006-177812 A | 7/2006 |
| JP | 2012-192683 A | 10/2012 |
| JP | 2012-196791 A | 10/2012 |
| JP | 2013-238755 A | 11/2013 |
| JP | 2013-241003 A | 12/2013 |
| JP | 2014-133396 A | 7/2014 |

\* cited by examiner

SPECTROMETRY DEVICE, IMAGE FORMING APPARATUS, AND SPECTROMETRY METHOD

BACKGROUND

1. Technical Field

The present disclosure relates to a spectrometry device, an image forming apparatus, and a spectrometry method.

2. Related Art

In the related art, a wavelength-selective interference filter may be capable of switching a transmitted wavelength by changing the dimension of a gap between reflecting films and a colorimetry device including the wavelength-selective interference filter. See, for example, JP-A-2013-238755.

In the colorimetry device of JP-A-2013-238755, a measurement target is irradiated with light, and light reflected by the measurement target is incident on the wavelength-selective interference filter. Light of a predetermined wavelength is transmitted by the wavelength-selective interference filter and is detected by a detector. At this time, the dimension of the gap between the reflecting films is sequentially changed by controlling the wavelength-selective interference filter to sequentially switch the wavelength of transmitted light, and the intensity of light of each wavelength is detected by the detector. Accordingly, a spectrum of the measurement target can be measured (color is measured).

Colorimetry may be performed on a color patch while the colorimetry device disclosed in JP-A-2013-238755 is moved in one direction at, for example, a constant speed. In such a case, the intensity of light is required to be obtained in a plurality of wavelengths desired to be measured while a measurement target region is moved by the colorimetry device in the color patch.

However, a change in the speed of movement of the colorimetry device, a shift in the position of installation of the color patch, or the like may cause the measurement target region to pass beyond the color patch during the period of time from the start of measurement until the end of measurement or cause the measurement to be started at an excessively early timing. Thus, the position of an area of measurement of the color patch may be shifted. In such a case, since colorimetry is performed at a position deviated from the color patch, colorimetry cannot be accurately performed on the color patch, and colorimetry accuracy is degraded.

SUMMARY

An advantage of some aspects of the present disclosure is to provide a spectrometry device, an image forming apparatus, and a spectrometry method capable of easily detecting the position of spectrometry.

According to an application example of the present disclosure, there is provided a spectrometry device including a spectroscope that includes a wavelength-selective interference filter on which light from a measurement target is incident, and a moving mechanism that moves the spectroscope relative to the measurement target in one direction. If the measurement target is a color patch, spectrometry is performed by changing the wavelength of light passed by the wavelength-selective interference filter in a first period during which the spectroscope is relatively moved in the one direction, the wavelength-selective interference filter passes light of a first wavelength at a start of measurement and at an end of measurement in the first period. A first measured value that is a measured value from the spectrometry at the start of measurement is compared with a second measured value that is a measured value from the spectrometry at the end of measurement.

In the application example, the spectroscope is moved relative to the measurement target color patch in the one direction, and the spectrometry is performed in the first period during which the spectroscope is relatively moved. At this time, in the spectrometry device of the application example, the wavelength of light emitted from the wavelength-selective interference filter is set to the first wavelength at the start of measurement and at the end of measurement in the first period, and the measured value (first measured value) at the start of measurement is compared with the measured value (second measured value) at the end of measurement.

That is, the first measured value and the second measured value are the same or approximately the same if the position (area of measurement) in which the spectrometry is performed in the first period is within the region of the color patch. Meanwhile, the first measured value and the second measured value are different if the position of the spectrometry is deviated from the region of the color patch at the start of measurement or at the end of measurement. Thus, by comparing the first measured value with the second measured value, a determination of whether the area of measurement is appropriate with respect to the color patch can be easily performed at a high speed. In addition, in the application example, there is no need to perform the spectrometry by stopping the spectroscope on the color patch, and thus, the amount of time related to the spectrometry can be decreased.

In the spectrometry device of the application example, a determination of whether the difference between the first measured value and the second measured value is less than or equal to a first threshold is performed.

In the application example, if the difference between the first measured value and the second measured value is less than or equal to the first threshold, it can be determined that the position of measurement is on the color patch at the start of measurement and at the end of measurement. Meanwhile, if the difference between the first measured value and the second measured value is greater than the first threshold, it can be determined that the position of measurement performed by the spectroscope is not on the color patch either at the start of measurement or at the end of measurement.

The measured values in the spectrometry may not completely match because of a change in the intensity of light incident on the color patch and influence of vibration or the like of the wavelength-selective interference filter. Therefore, by setting the first threshold to an appropriate value considering such influence, output of error such as shifting of the area of measurement even in a case where the spectrometry is normally performed on the color patch is prevented, and a delay in the spectrometry due to output of error can be reduced.

In the spectrometry device of the application example, the spectroscope includes a light receiver that receives light emitted from the wavelength-selective interference filter, and that the first measured value is compared with the second measured value by using an output value from the light receiver as the measured value.

The application example includes the light receiver that receives light from the wavelength-selective interference filter. In this case, a determination of whether the area of measurement is appropriate with respect to the color patch can be performed by using an output signal from the light receiver as the measured value.

Therefore, a determination of whether the area of measurement is appropriate with respect to the color patch can be easily performed at a high speed compared with, for example, a case of using a result of calculation of a reflectance or the like of the color patch with respect to the first wavelength.

The spectrometry device of the application example further includes a control unit that controls the spectroscope and the moving mechanism.

In the application example, the control unit can control the spectroscope and the moving mechanism.

In the spectrometry device of the application example, the control unit includes a filter controller that changes a wavelength of light passing through the wavelength-selective interference filter.

In the application example, the filter controller can control the wavelength of light passing through the wavelength-selective interference filter.

In the spectrometry device of the application example, the spectroscope performs spectrometry on a plurality of the color patches arranged in the one direction. The color patch in which the measured value is greater than or equal to a second threshold is selected, and the first measured value and the second measured value of the selected color patch are compared with each other.

In the application example, the spectroscope is moved relative to the plurality of color patches lined up in the one direction, and the first measured value and the second measured value of the color patch in which the measured value is greater than or equal to the second threshold are compared with each other. If the first measured value and the second measured value are less than the second threshold, the reflectance of the color patch is not good with respect to the first wavelength, and the intensity of light is not sufficiently obtained. Thus, influence of a noise component or the like is likely to be received. Regarding this matter, in the application example, since the first measured value and the second measured value that are greater than or equal to the second threshold are compared with each other, influence of such noise is unlikely to be received, and a determination of whether the area of measurement is appropriate with respect to the color patch can be more accurately performed.

In the spectrometry device of the application example, a determination of whether the difference between the first measured value and the second measured value is less than or equal to a first threshold is performed. If the difference between the first measured value and the second measured value is greater than the first threshold, a direction in which a first position that is a position of the spectroscope at the time of measuring the first measured value and a second position that is a position of the spectroscope at the time of measuring the second measured value are shifted from the first position and the second position at the time of the spectrometry performed within the region of the color patch is detected.

In the application example, the spectrometry device detects the direction of shifting if it is determined that the area of measurement of the spectrometry performed in the first period is shifted from the color patch.

Accordingly, since the direction in which the area of measurement is shifted can be determined, a determination of the direction in which the area of measurement is to be shifted in order to appropriately set the area of measurement with respect to the color patch. That is, a determination of whether to increase or decrease the start of measurement and the end of measurement in the first period can be easily performed. Therefore, even if an error such as shifting of the area of measurement is output, an error restoration process for restoration can be easily performed against the error.

In the spectrometry device of the application example, the direction is detected based on a third measured value that is a measured value before the first period at the time of performing the spectrometry with light of the first wavelength by relatively moving the spectroscope in the one direction, a fourth measured value that is a measured value after the first period at the time of performing the spectrometry with light of the first wavelength by relatively moving the spectroscope in the one direction, the first measured value, and the second measured value.

In the application example, the spectroscope is relatively moved in the one direction in a state where the wavelength of light emitted from the wavelength-selective interference filter is fixed to the first wavelength, the measured value obtained before the spectrometry performed in the first period is obtained as the third measured value, and the measured value obtained after the spectrometry performed in the first period is obtained as the fourth measured value. Then, the direction of shifting of the area of measurement is detected based on the first measured value, the second measured value, the third measured value, and the fourth measured value.

The positions at which the third measured value and the fourth measured value are measured are respectively set to a position between a first measurement position and one end of the color patch and a position between a second measurement position and the other end of the color patch if the area of measurement is appropriately set with respect to the color patch. In this case, if the area of measurement is appropriately set within the color patch, the first measured value, the second measured value, the third measured value, and the fourth measured value are the same or approximately the same (the difference therebetween is less than or equal to the first threshold). Meanwhile, if the area of measurement is shifted, either the difference between the first measured value and the third measured value or the difference between the second measured value and the fourth measured value is greater than the first threshold depending on the direction of positional shifting. Therefore, the direction of shifting can be easily detected by comparing these four measured values.

In the spectrometry device of the application example, the direction is detected based on a reflectance of a color around the color patch with respect to the first wavelength, the first measured value, and the second measured value.

If the reflectance of the area around the color patch is known with respect to the first wavelength, a determination of whether the measured value changes in a peak form or changes in a valley form in the color patch can be easily performed at the time of scanning performed with the spectroscope in the one direction in a state where the wavelength of light emitted from the wavelength-selective interference filter is fixed to the first wavelength. Thus, by comparing a magnitude relationship between the first measured value and the second measured value, the direction of shifting of the area of measurement can be easily detected. For example, in a case where the reflectance in the first wavelength is known as changing in a peak form in the color patch at the time of scanning performed with the spectroscope, it can be determined that the start of measurement and the end of measurement in the first period are late (the area of measurement is shifted frontward in the one direction) if the first measured value is greater than the second measured value, and it can be determined that the start of measurement and the end of measurement in the first period are early (the area of measurement is shifted rearward in the one direction) if the first measured value is smaller than the second measured value. In a case where the reflectance in the first wavelength is known as changing in a valley form in the color patch, it can be determined that the start of measurement and the end of measurement in the first period are early if the first measured value is greater than the second measured value, and it can be determined that the start of measurement and the end of measurement in the first period are late if the first measured value is smaller than the second measured value.

In the spectrometry device of the application example, a determination of whether the difference between the first measured value and the second measured value is less than or equal to a first threshold is performed, and that, if the difference between the first measured value and the second measured value is greater than the first threshold, an amount of shifting by which a first position that is a position of the spectroscope at the time of measuring the first measured value and a second position that is a position of the spectroscope at the time of measuring the second measured value are shifted from the first position and the second position at the time of the spectrometry performed within the region of the color patch is calculated.

In the application example, the amount of shifting is calculated if the area of measurement is shifted from the color patch. Accordingly, since the amount of movement of the area of measurement for appropriate setting of the area of measurement with respect to the color patch, that is, the amount of time for changing the start of measurement and the end of measurement in the first period is known, the error restoration process can be easily performed.

In the spectrometry device of the application example, the amount of shifting is calculated based on the first measured value and the second measured value with respect to two or more of the color patches continuously arranged.

If the direction of shifting of the area of measurement is rearward, the amount of shifting can be calculated by using a trigonometric function provided that the first measured value and the second measured value with respect to a predetermined color patch and the first measured value in a subsequently arranged color patch are determined. If the direction of shifting of the area of measurement is frontward, the amount of shifting can be calculated by using a trigonometric function on the basis of the first measured value and the second measured value in a predetermined color patch and the second measured value in a color patch arranged before the predetermined color patch. That is, the amount of shifting can be easily calculated provided that the first measured value and the second measured value with respect to at least two continuous color patches are determined.

In the spectrometry device of the application example, the moving mechanism moves the spectroscope in the one direction at a uniform speed.

In the application example, the moving mechanism relatively moves the spectroscope at a uniform speed. Thus, the position of the spectroscope at the start of measurement and at the end of measurement in the first period can be easily detected without separately disposing a sensor or the like measuring the position of the spectroscope.

According to another application example of the present disclosure, there is provided a spectrometry device including a spectroscope on which light from a measurement target is incident, and a moving mechanism that moves the spectroscope relative to the measurement target, in which a first measured value that is a measured value of light of a first wavelength at a first time is compared with a second measured value that is a measured value of light of the first wavelength at a second time.

In the application example, as described above, by comparing the first measured value and the second measured value, a determination of whether the area of measurement is appropriate with respect to the color patch can be easily performed at a high speed.

In addition, the measurement target is not limited to the color patch, and a determination of whether the area of measurement is appropriate can be performed in an arbitrary measurement target.

In addition, in any state in the spectrometry not limited to a state where the spectroscope is constantly moved relative to the measurement target during the spectrometry, a determination of whether the measurement is appropriately performed can be performed in an arbitrary measurement target by comparing the first measured value that is a measured value of light of the first wavelength at the first time with the second measured value that is a measured value of light of the first wavelength at the second time.

According to still another application example of the present disclosure, there is provided an image forming apparatus including the spectrometry device, and an image forming unit that forms an image on an image formation target.

In the application example, a color patch such as the one described above is formed by the image forming unit on the image formation target, after which spectrometry can be performed on the formed color patch by the spectrometry device. In addition, in such an image forming apparatus, it is possible to check whether the color of the formed color patch is the same as the color that the image forming unit is instructed to form, and, if the colors are different, feedback can be provided to the image forming unit in accordance with a spectrometry result.

According to still another application example of the present disclosure, there is provided a spectrometry method that performs spectrometry on a color patch as a measurement target by using a spectrometry device including a spectroscope which includes a wavelength-selective interference filter on which light from the measurement target is incident and a moving mechanism which moves the spectroscope relative to the measurement target in one direction, the method including relatively moving the spectroscope in the one direction, performing spectrometry by changing a wavelength of light passing through the wavelength-selective interference filter in a first period during which the spectroscope is relatively moved, passing light of a first wavelength through the wavelength-selective interference filter at a start of measurement and at an end of measurement in the first period, and comparing a first measured value that is a measured value from the spectrometry at the start of measurement with a second measured value that is a measured value from the spectrometry at the end of measurement.

In the application example, the same effect as the spectrometry device can be achieved, the area of measurement can be set to an appropriate position with respect to the color patch, and the spectrometry can be accurately performed on the color patch.

According to still another application example of the present disclosure, there is provided a spectrometry method including performing spectrometry on light from a measurement target by using a spectroscope that is capable of moving relative to the measurement target, and comparing a first measured value that is a measured value of light of a first wavelength at a first time with a second measured value that is a measured value of light of the first wavelength at a second time.

In the application example, as described above, by comparing the first measured value and the second measured value, a determination of whether the area of measurement is appropriate with respect to the color patch can be easily performed at a high speed.

In addition, the measurement target is not limited to the color patch, and a determination of whether the area of measurement is appropriate can be performed in an arbitrary measurement target.

In addition, in any state in the spectrometry not limited to a state where the spectroscope is constantly moved relative to the measurement target during the spectrometry, a determination of whether the measurement is appropriately performed can be performed in an arbitrary measurement target by comparing the first measured value that is a measured value of light of the first wavelength at the first time with the second measured value that is a measured value of light of the first wavelength at the second time.

BRIEF DESCRIPTION OF THE DRAWINGS

The present disclosure will be described with reference to the accompanying drawings, wherein like numbers reference like elements.

DESCRIPTION OF EXEMPLARY EMBODIMENTS

First Embodiment

Hereinafter, a first embodiment according to the present disclosure will be described based on the drawings. In the present embodiment, hereinafter, a printer 10 (ink jet printer) that includes a spectrometry device will be described as an example of an image forming apparatus of the present disclosure.

Schematic Configuration of Printer

Figure 1:
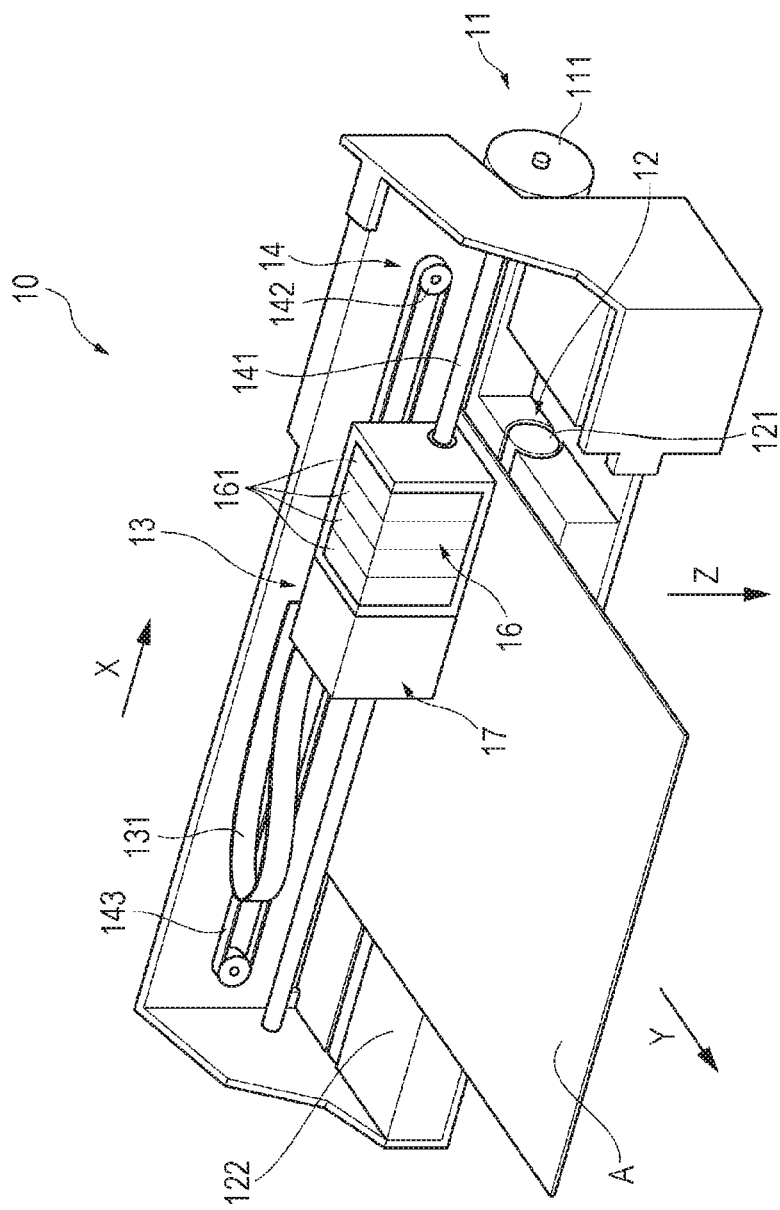
FIG. 1 is an exterior view illustrating a schematic configuration of a printer of a first embodiment according to the present disclosure.
Figure 2:
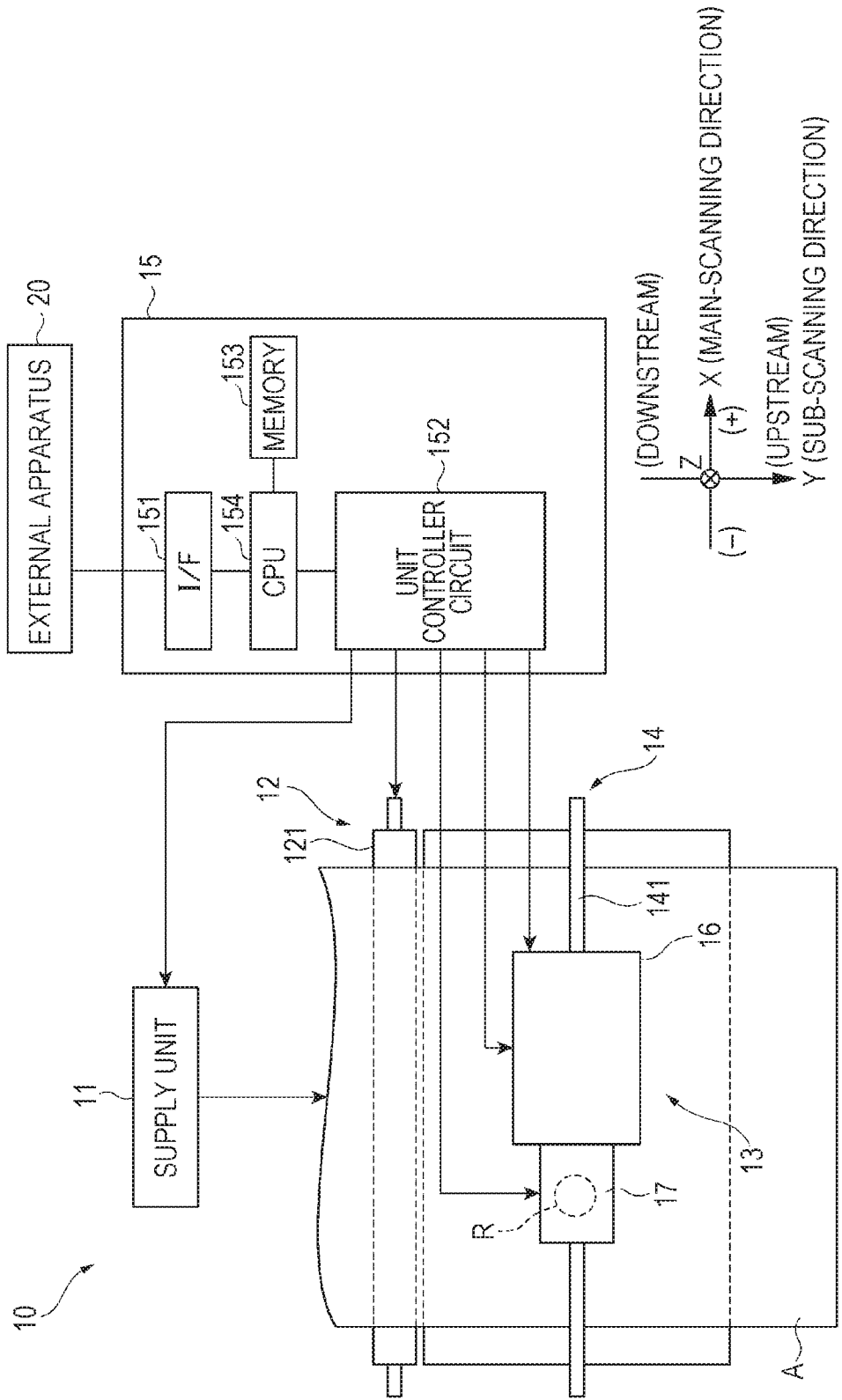
FIG. 2 is a block diagram illustrating a schematic configuration of the printer of the first embodiment.

FIG. 1 is a diagram illustrating an exterior configuration example of the printer 10 of the first embodiment. FIG. 2 is a block diagram illustrating a schematic configuration of the printer 10 of the present embodiment.

As illustrated in FIG. 1, the printer 10 includes a supply unit 11, a transport unit 12, a carriage 13, a carriage moving unit 14, and a control unit 15 (refer to FIG. 2). The printer 10 controls each of the units 11, 12, 14, and the carriage 13 based on print data that is input from an external apparatus 20, such as a personal computer, and prints an image on a medium A. In addition, the printer 10 of the present embodiment forms a measurement color patch 31 (refer to FIG. 9) at a predetermined position on the medium A on the basis of preset calibration print data and performs spectrometry on the color patch 31. Accordingly, the printer 10 determines whether a color shift is present in the printed color by comparing an actual measured value from the color patch 31 with the calibration print data. If a color shift is present, the printer 10 corrects color based on the actual measured value.

Hereinafter, each configuration of the printer 10 will be specifically described.

The supply unit 11 supplies the image formation target medium A (illustrated as white paper in the present embodiment) to the position of image formation. The supply unit 11, for example, includes a roll body 111 (refer to FIG. 1) on which the medium A is wound, a roll drive motor (not illustrated), and a roll drive wheel array (not illustrated). The roll drive motor is rotationally driven in response to an instruction from the control unit 15, and the torque of the roll drive motor is transmitted to the roll body 111 through the roll drive wheel array. Accordingly, the roll body 111 rotates and supplies the paper wound on the roll body 111 to the downstream side (+Y direction) in a Y direction (sub-scanning direction).

While the present embodiment illustrates supply of paper that is wound on the roll body 111, this illustration is not for limitation purposes. The medium A may be supplied in any suitable method, such as supplying paper stacked in a tray (e.g., medium A) one sheet at a time by a roller.

The transport unit 12 transports the medium A supplied from the supply unit 11 in the Y direction. The transport unit 12 is configured to include a transport roller 121, a driven roller (not illustrated), and a platen 122. The driver roller is arranged such that the medium A is between the transport roller 121 and the driven roller and driven by the transport roller 121.

A drive force is applied to the transport roller 121 by a transport motor (not illustrated). If the transport motor is driven under control of the control unit 15, the transport roller 121 is rotationally driven by the torque of the transport motor and transports, in the Y direction, the medium A that is interposed between the transport roller 121 and the driven roller. The platen 122 that faces the carriage 13 is disposed on the downstream side (+Y side) of the transport roller 121 in the Y direction.

The carriage 13 includes a printing unit 16 that prints an image on the medium A and a spectroscope 17 that performs spectrometry in a predetermined measurement target region R on the medium A (refer to FIG. 2).

The carriage 13 is disposed to be movable by the carriage moving unit 14 in a main-scanning direction (i.e., one direction), such as the X direction which intersects the Y direction.

The carriage 13 is connected to the control unit 15 by a flexible circuit 131 and performs a printing process (i.e., process of forming an image on the medium A) with the printing unit 16 and a spectrometry process with the spectroscope 17 in response to an instruction from the control unit 15.

A detailed configuration of the carriage 13 will be described later.

The carriage moving unit 14 constitutes a moving mechanism of the present disclosure and causes the carriage to reciprocate in the X direction in response to an instruction from the control unit 15.

The carriage moving unit 14, for example, is configured to include a carriage guide shaft 141, a carriage motor 142, and a timing belt 143.

The carriage guide shaft 141 is arranged in the X direction and has both end portions fixed to, for example, the casing of the printer 10. The carriage motor 142 drives the timing belt 143. The timing belt 143 is supported approximately parallel to the carriage guide shaft 141, and a part of the carriage 13 is fixed thereto. If the carriage motor 142 is driven in response to an instruction of the control unit 15, the timing belt 143 travels in normal (i.e., forward) and reverse directions, and the carriage 13 fixed to the timing belt 143 reciprocates while being guided by the carriage guide shaft 141.

Next, a configuration of the printing unit 16 and the spectroscope 17 disposed in the carriage 13 will be described.

Configuration of Printing Unit (Image Forming Unit)

The printing unit 16 is an image forming unit of the present disclosure and forms an image on the medium A by discharging ink separately onto the medium A from the part facing the medium A.

Ink cartridges 161 that correspond to ink of a plurality of colors are mounted on the printing unit 16 in an attachable and detachable manner. Ink is supplied from each ink cartridge 161 to an ink tank (not illustrated) through a tube (not illustrated). In addition, nozzles (not illustrated) that discharge ink drops are disposed on the lower face of the printing unit 16 (i.e., at a position facing the medium A) in correspondence with each color. A piezoelectric element, for example, is arranged in each of these nozzles. Driving the piezoelectric element causes an ink drop supplied from the ink tank to be discharged and hit the medium A, and a dot is formed.

Configuration of Spectroscope

Figure 3:
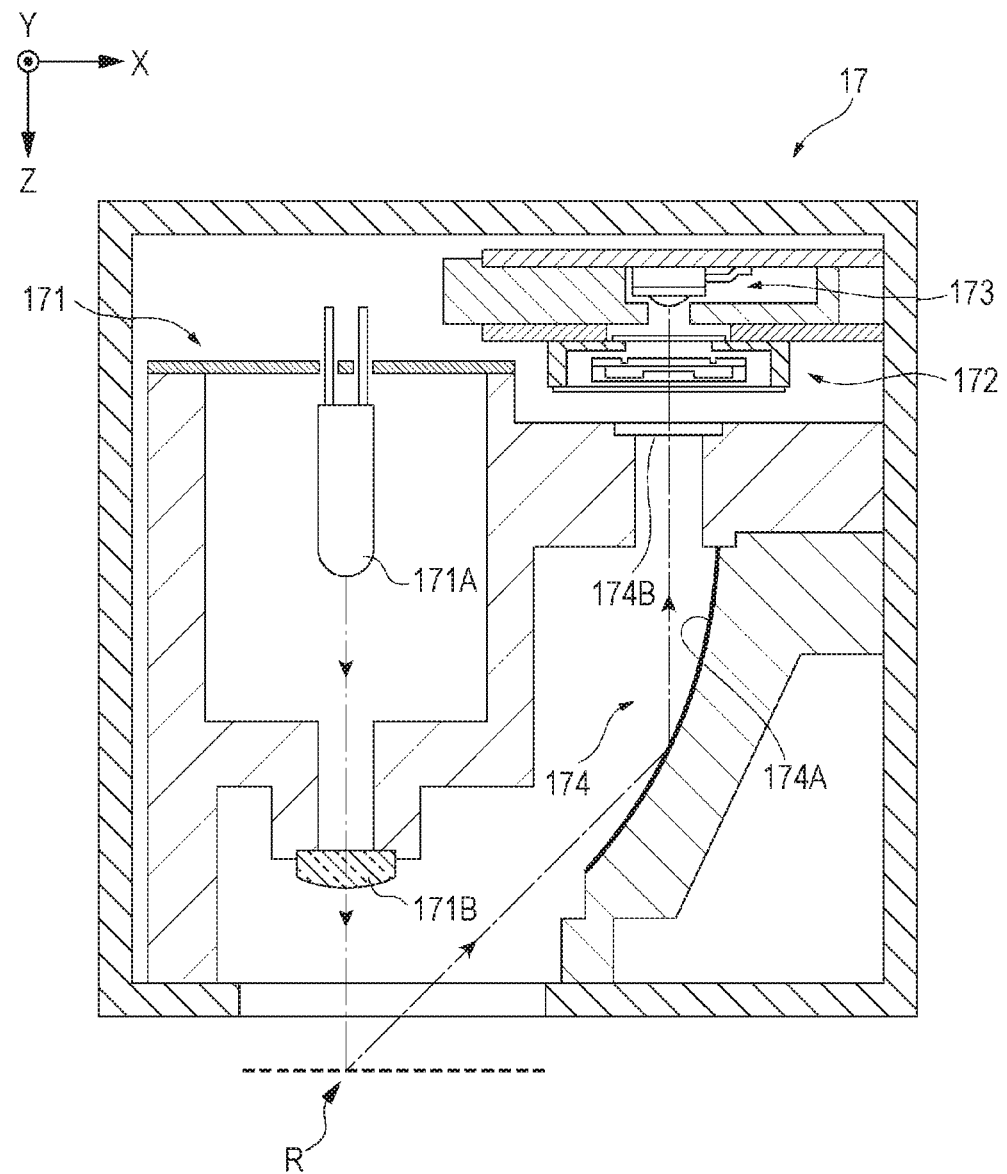
FIG. 3 is a sectional view illustrating a spectroscope of the first embodiment.

FIG. 3 is a sectional view illustrating a schematic configuration of the spectroscope 17.

The spectroscope 17 includes a light source unit 171, an optical filter device 172, a light receiver 173, and a light guide 174 as illustrated in FIG. 3.

The spectroscope 17 irradiates the medium A with light from the light source unit 171 and causes a light component reflected by the medium A to be incident on the optical filter device 172 by using the light guide 174. Light of a predetermined wavelength is emitted (transmitted) by the optical filter device 172 from the reflected light and is received by the light receiver 173. The optical filter device 172 can select a transmitted wavelength under control of the control unit 15 and can perform spectrometry in the measurement target region R on the medium A by measuring the intensity of light of each wavelength in visible light.

Configuration of Light Source Unit

The light source unit 171 includes a light source 171A and a condenser 171B. The light source unit 171 irradiates the measurement target region R of the medium A with light emitted from the light source 171A in the direction of the normal line of the surface of the medium A.

As the light source 171A, it is preferable to use a light source that can emit light of each wavelength in the visible light region. For example, the light source 171A can be a halogen lamp, a xenon lamp, and a white LED, and particularly, it is preferable to use a white LED that can be easily installed in a limited space in the carriage 13. The condenser 171B is configured of, for example, a condenser lens and condenses light from the light source 171A in the measurement target region R. While only one lens (condenser lens) is illustrated in the condenser 171B, the condenser 171B may be configured by combining a plurality of lenses.

Configuration of Optical Filter Device

Figure 4:
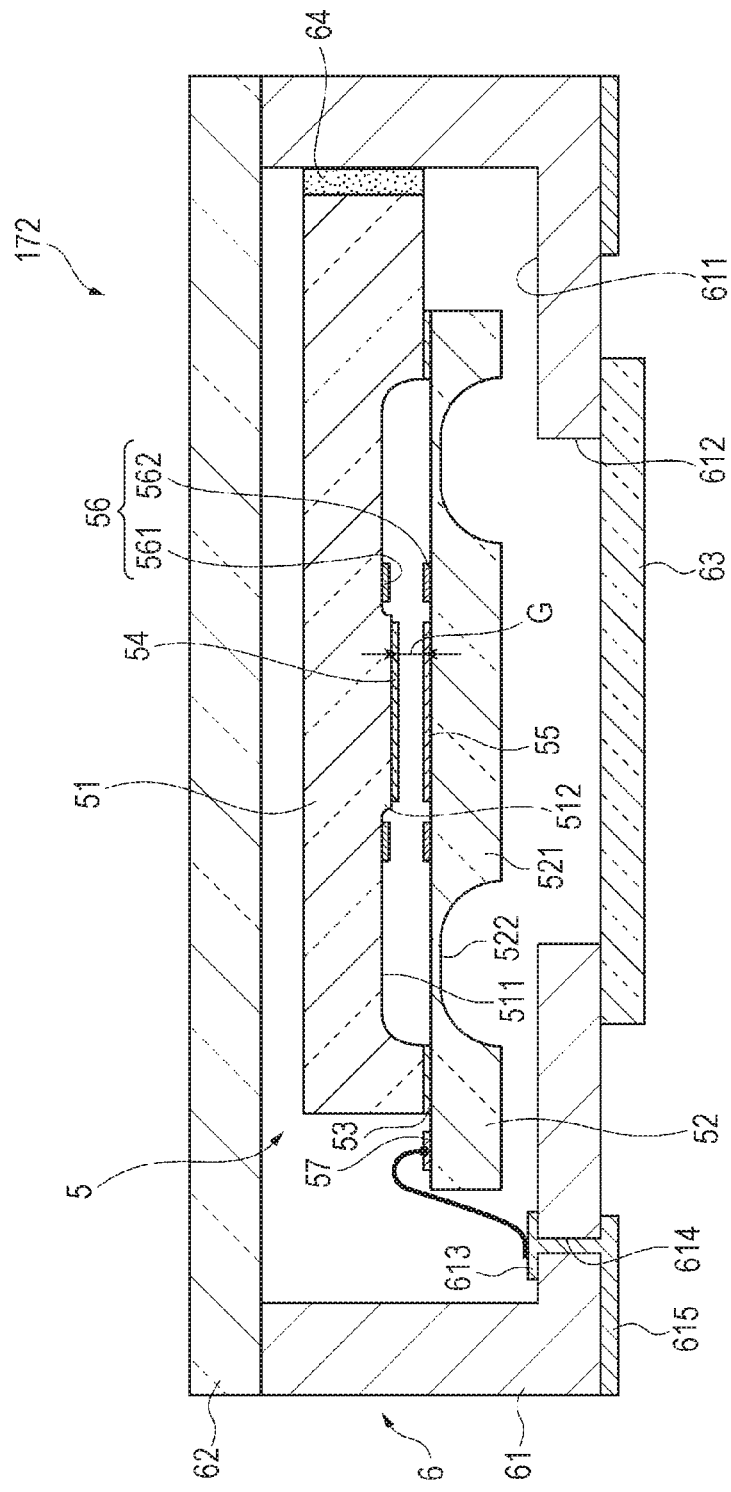
FIG. 4 is a sectional view illustrating an optical filter device of the first embodiment.

FIG. 4 is a sectional view illustrating a schematic configuration of the optical filter device 172.

The optical filter device 172 includes a casing 6 and a wavelength-selective interference filter 5 that is accommodated in the casing 6.

Configuration of Wavelength-Selective Interference Filter

The wavelength-selective interference filter 5 is a wavelength-selective Fabry-Pérot etalon element and includes a light-transmissive fixed substrate 51 and a light-transmissive movable substrate 52. The fixed substrate 51 and the movable substrate 52 are integrally configured by bonding using a bonding film 53.

The fixed substrate 51 includes a first groove portion 511 formed by etching and a second groove portion 512 that is shallower than the first groove portion 511. A fixed electrode 561 is disposed in the first groove portion 511, and a fixed reflecting film 54 is disposed in the second groove portion 512.

The fixed electrode 561 is formed into, for example, a ring shape surrounding the second groove portion 512 and faces a movable electrode 562 disposed in the movable substrate 52.

The fixed reflecting film 54 is, for example, configured of a metal film made of Ag, an alloy film made of an Ag alloy, a dielectric multilayer film made of a laminate of a high-refractive layer and a low-refractive layer, or a laminated body made of a laminate of a metal film (alloy film) and a dielectric multilayer film.

The movable substrate 52 includes a movable portion 521 and a holding portion 522 that is disposed outside of the movable portion 521 to hold the movable portion 521.

The movable portion 521 is formed to have a greater dimension of thickness than the holding portion 522. The movable portion 521 is formed to have a greater diametral dimension than the outer circumferential edge of the fixed electrode 561, and the movable electrode 562 and a movable reflecting film 55 are disposed on a face of the movable portion 521 facing the fixed substrate 51.

The movable electrode 562 is disposed at a position facing the fixed electrode 561.

The movable reflecting film 55 is arranged at a position facing the fixed reflecting film 54 through a gap G. As the movable reflecting film 55, a reflecting film having the same configuration as the fixed reflecting film 54 can be used.

The holding portion 522 is a diaphragm that surrounds the movable portion 521 and is formed to have a smaller thickness dimension than the movable portion 521. The holding portion 522 is more likely to bend than the movable portion 521. Thus, slight electrostatic attraction can displace the movable portion 521 toward the fixed substrate 51. Accordingly, the dimension of the gap G can be changed in a state where parallelism of the fixed reflecting film 54 and the movable reflecting film 55 is maintained.

While the present embodiment is illustrated by the holding portion 522 of a diaphragm shape, this is not for limitation purposes. For example, it is also possible to use a configuration in which beam-shaped holding portions arranged at equiangular intervals are disposed around a planar center.

In the peripheral portion of the movable substrate (i.e., region not facing the fixed substrate 51), a plurality of electrode pads 57 that is individually connected to the fixed electrode 561 and to the movable electrode 562 is disposed.

Configuration of Casing

The casing 6 includes a base 61 and a glass substrate 62, as illustrated in FIG. 4. The base 61 and the glass substrate 62 can be formed by using, for example, low-melting glass bonding using glass frit (low-melting glass) or adhesion by an epoxy resin or the like. Accordingly, an accommodative space is formed therein, and the wavelength-selective interference filter 5 is accommodated in the accommodative space.

The base 61 is configured of, for example, a laminate of ceramic on a thin plate and includes a recessed portion 611 that can accommodate the wavelength-selective interference filter 5. The wavelength-selective interference filter 5 is fixed to, for example, a side face of the recessed portion 611 of the base 61 by a fixing material 64.

A light pass hole 612 is disposed on the bottom face of the recessed portion 611 of the base 61. The light pass hole 612 is disposed to include a region overlapping with the reflecting films 54 and 55 of the wavelength-selective interference filter 5. A cover glass 63 that covers the light pass hole 612 is bonded to the face of the base 61 opposite to the glass substrate 62.

An inside terminal unit 613 is disposed in the base and is connected to the electrode pad 57 of the wavelength-selective interference filter 5. The inside terminal unit 613 is connected through a conductive hole 614 to an outside terminal unit 615 that is disposed outside of the base 61. The outside terminal unit 615 is electrically connected to the control unit 15.

Configuration of Light Receiver and Light Guiding Optical System

Returning to FIG. 3, the light receiver 173 is arranged on the optical axis of the wavelength-selective interference filter 5 and receives light that is transmitted through the wavelength-selective interference filter 5. The light receiver 173 outputs a detection signal (e.g., current value) corresponding to the intensity of received light under control of the control unit 15. The detection signal output by the light receiver 173 is input into the control unit 15 through an I-V converter (not illustrated), an amplifier (not illustrated), and an AD converter (not illustrated).

The light guide 174 includes a reflecting mirror 174A and a bandpass filter 174B.

The light guide 174 reflects light that is reflected in the measurement target region R on the surface of the medium A at 45° onto the optical axis of the wavelength-selective interference filter 5 by using the reflecting mirror 174A. The bandpass filter 174B transmits light in the visible light region (e.g., 380 nm to 720 nm) and cuts ultraviolet light and infrared light. Accordingly, light in the visible light region is incident on the wavelength-selective interference filter 5, and the light receiver 173 receives light of a wavelength in the visible light region selected by the wavelength-selective interference filter 5.

Configuration of Control Unit

The control unit 15 is configured to include an I/F 151, a unit controller circuit 152, a memory 153, and a central processing unit (CPU) 154, as illustrated in FIG. 2.

The I/F 151 inputs to the CPU 154 the print data that is input from the external apparatus 20.

The unit controller circuit 152 includes a controller circuit that controls each of the supply unit 11, the transport unit 12, the printing unit 16, the light source 171A, the wavelength-selective interference filter 5, the light receiver 173, and the carriage moving unit 14. The unit controller circuit 152 controls operation of each unit based on an instruction signal from the CPU 154. It is also possible that a controller circuit of each unit is disposed separately from the control unit 15 and is connected to the control unit 15.

The memory 153 stores various programs and various data that control operation of the printer 10.

For example, the memory 153 may store V–λ data that represents the wavelength of light transmitted through the wavelength-selective interference filter 5 with respect to the voltage applied to the electrostatic actuator 56 at the time of controlling the wavelength-selective interference filter 5 and printing profile data that provides the amount of each ink to be discharged with respect to color data which is included as the print data. In addition, the memory 153 may store light emitting characteristics (i.e., emission spectrum) of the light source 171A with respect to each wavelength, light receiving characteristics (i.e., light reception sensitivity characteristics) of the light receiver 173 with respect to each wavelength, and the like.

Figure 5:
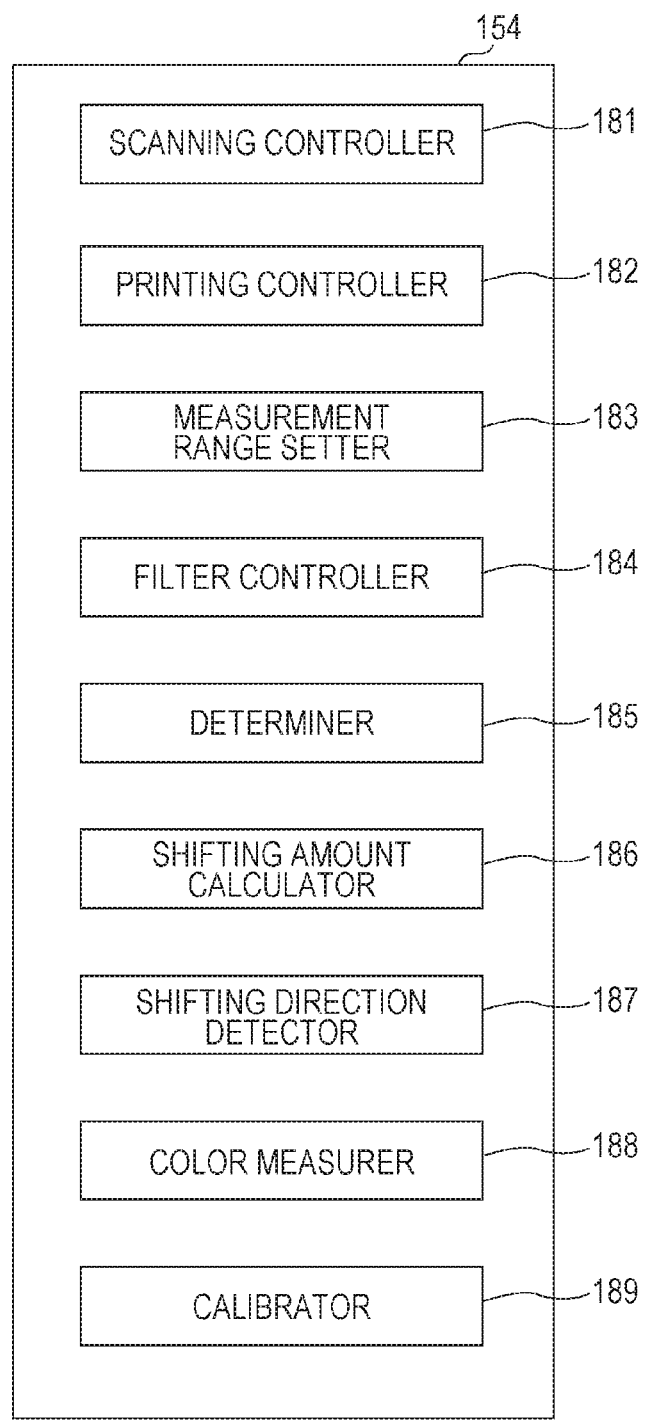
FIG. 5 is a block diagram illustrating a functional configuration of a CPU included in a control unit in the first embodiment.

FIG. 5 is a block diagram illustrating a functional configuration of the CPU included in the control unit 15 of the printer 10.

The CPU 154 functions as a scanning controller 181, a printing controller 182, a measurement range setter 183, a filter controller 184, a determiner 185, a shifting amount calculator 186, a shifting direction detector 187 (i.e., direction detector), a color measurer 188, and a calibrator 189, by reading and executing various programs stored in the memory 153.

The scanning controller 181 outputs to the unit controller circuit 152 an instruction signal that indicates driving of the supply unit 11, the transport unit 12, and the carriage moving unit 14. Accordingly, the unit controller circuit 152 drives the roll drive motor of the supply unit 11 and supplies the medium A to the transport unit 12. The unit controller circuit 152 drives the transport motor of the transport unit 12 to transport a predetermined region of the medium A in the Y direction to a position on the platen 122 facing the carriage 13. The unit controller circuit 152 drives the carriage motor 142 of the carriage moving unit 14 to move the carriage 13 in the X direction.

The printing controller 182 outputs an instruction signal that indicates control of the printing unit 16 to the unit controller circuit 152 based on, for example, the print data that is input from the external apparatus 20. In the present embodiment, the printing controller 182 forms the color patch 31 on the medium A based on the preset calibration print data intended to form the color patch 31 of a predetermined color at a predetermined position. The calibration print data may be stored in the memory 153 or may be input from the external apparatus 20.

The color patch 31 will be described in detail later.

If the instruction signal is output to the unit controller circuit 152 from the printing controller 182, the unit controller circuit 152 outputs a printing control signal to the printing unit 16 to drive the piezoelectric element disposed in the nozzle and causes ink to be discharged to the medium A. At the time of performing printing, an image configured of a plurality of dots is printed on the medium A by alternately repeating a dot forming operation that moves the carriage 13 in the X direction and discharges ink from the printing unit 16 during the moving to form a dot and a transport operation that transports the medium A in the Y direction.

The measurement range setter 183 sets an area of measurement M (refer to FIG. 9) for the color patch 31 and sets a measurement start time and a measurement cycle time length for performing spectrometry in the area of measurement.

Figure 9:
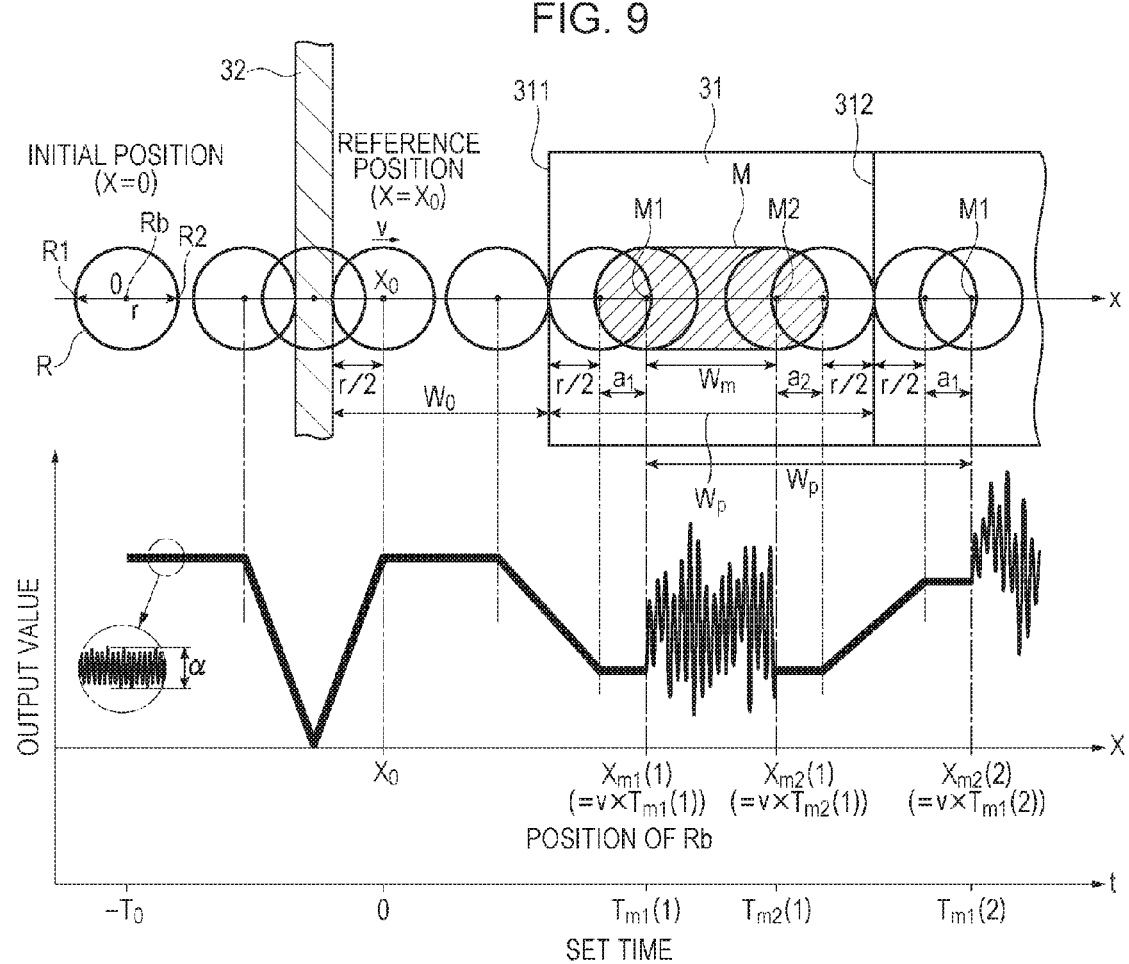
FIG. 9 is a diagram illustrating a relationship among a position of a measurement target region with respect to a color patch, a change in output value, and a time of movement of a carriage in the first embodiment.

The color patch 31, as described above, is formed on the medium A based on the calibration print data. The width dimension of the color patch in the X direction is equal to a predetermined dimension recorded in the calibration print data. In the present embodiment, spectral characteristics of light for a plurality of wavelengths at a predetermined interval in the visible light region (e.g., light of 16 bands from 400 nm to 700 nm at an interval of 20 nm) is obtained from one color patch 31. Therefore, the wavelength-selective interference filter 5 is driven in such a manner that light of the plurality of wavelengths can be obtained during movement of the measurement target region R (refer to FIG. 9) on one color patch 31. As shown in FIG. 9, the measurement range setter 183 sets each of a start position M1 and an end position M2 of the area of measurement M in the region of the color patch 31 based on a filter drive time $T_n$ necessary for switching the transmitted light of the wavelength-selective interference filter 5, the number of types of obtained light (number of bands) n, a speed v at the time of moving the carriage 13 in the X direction (uniform linear motion), and the dimension (patch width $W_p$) of the color patch. The time of movement of a predetermined reference point Rb of the measurement target region R to the set start position M1 and the end position M2 (measurement start time and measurement end time) is calculated.

The filter controller 184 reads a drive voltage for the electrostatic actuator 56 with respect to the wavelength of light transmitted through the wavelength-selective interference filter 5 from the V–λ data stored in the memory 153 and outputs an instruction signal to the unit controller circuit 152. Accordingly, the unit controller circuit 152 applies the drive voltage from the instruction signal to the wavelength-selective interference filter 5, and light of a desired transmitted wavelength is transmitted through the wavelength-selective interference filter 5.

The filter controller 184 switches the voltage applied to the electrostatic actuator 56 based on the area of measurement set by the measurement range setter 183, the speed of movement of the carriage 13 moved by the scanning controller 181, and the time elapsing from the start of movement.

The determiner 185 determines whether the area of measurement is within the region of the color patch 31 based on a measured value when the reference point Rb of the measurement target region R is positioned at the start position M1 of the area of measurement M in the color patch and a measured value when the reference point Rb is positioned at the end position M2 of the area of measurement M in the color patch 31. In other words, the determiner 185 determines whether the area of measurement is not positionally shifted and does not partially extend out of the color patch 31.

In the present embodiment, an output signal (i.e., output value) from the light receiver 173 is used as the measured value. Hereinafter, the output value from the light receiver 173 when the reference point Rb of the measurement target region R is positioned at the start position M1 of the area of measurement M in the i-th color patch 31 is a first output value $V_1(i)$ (i.e., first measured value) and that the output value from the light receiver 173 when the reference point Rb of the measurement target region R is positioned at the end position M2 of the area of measurement M in the i-th color patch 31 is a second output value $V_2(i)$ (i.e., second measured value).

The shifting amount calculator 186 calculates the amount of shifting in a case where the area of measurement M is shifted from the color patch 31.

The shifting direction detector 187 detects the direction of shifting in a case where the area of measurement M is shifted from the color patch 31.

The color measurer 188 measures the intensity of color in the color patch 31 based on a spectrometry result with respect to the light of the plurality of wavelengths obtained in the area of measurement.

The calibrator 189 corrects (updates) the printing profile data based on a result of colorimetry performed by the color measurer 188 and the calibration print data.

Operation of each functional configuration in the control unit 15 will be described in detail later.

Spectrometry Method

Next, a spectrometry method in the printer 10 of the present embodiment will be described based on the drawings.

Figure 6:
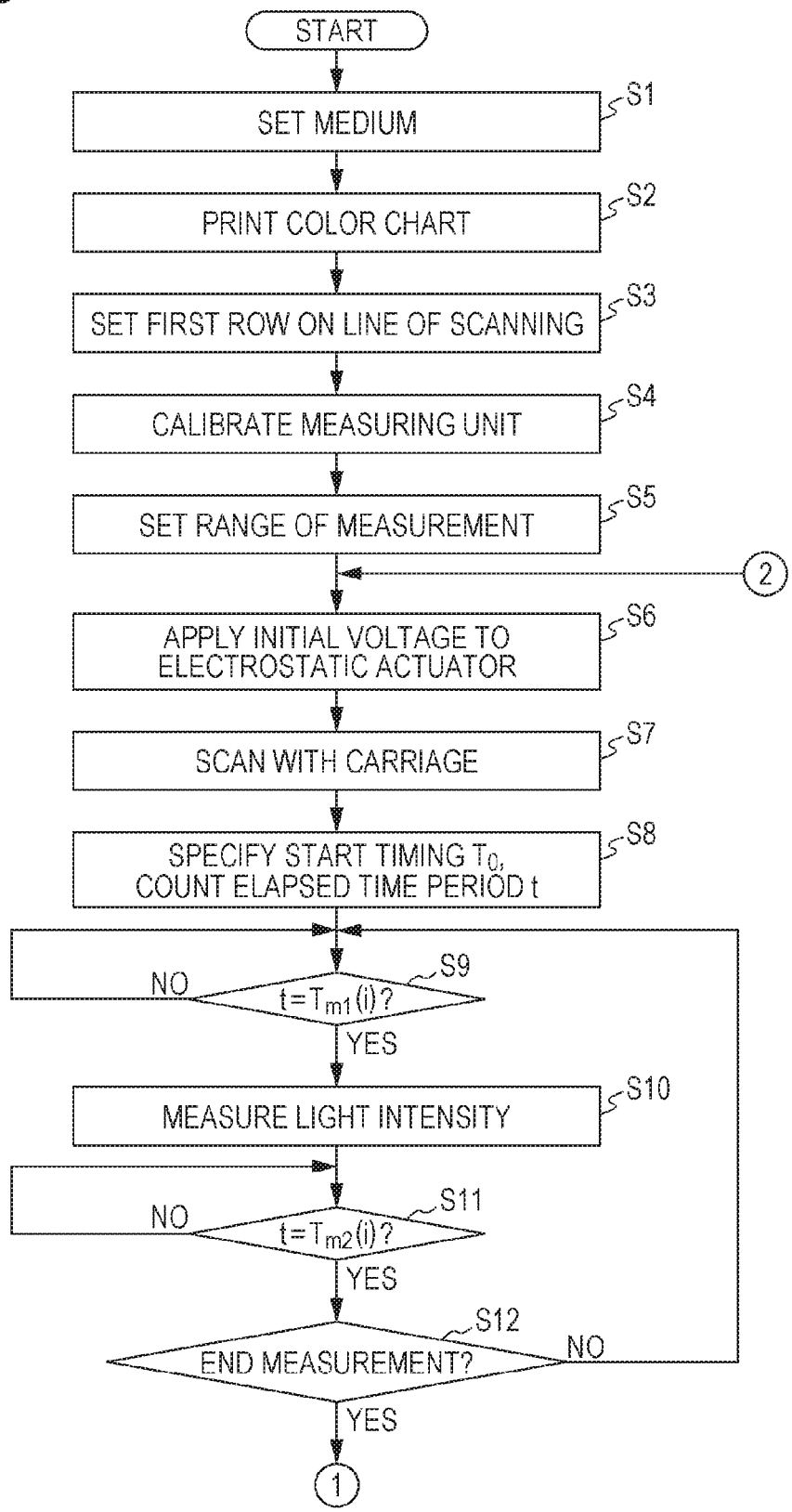
FIG. 6 is a flowchart illustrating a spectrometry method for the printer of the first embodiment.
Figure 7:
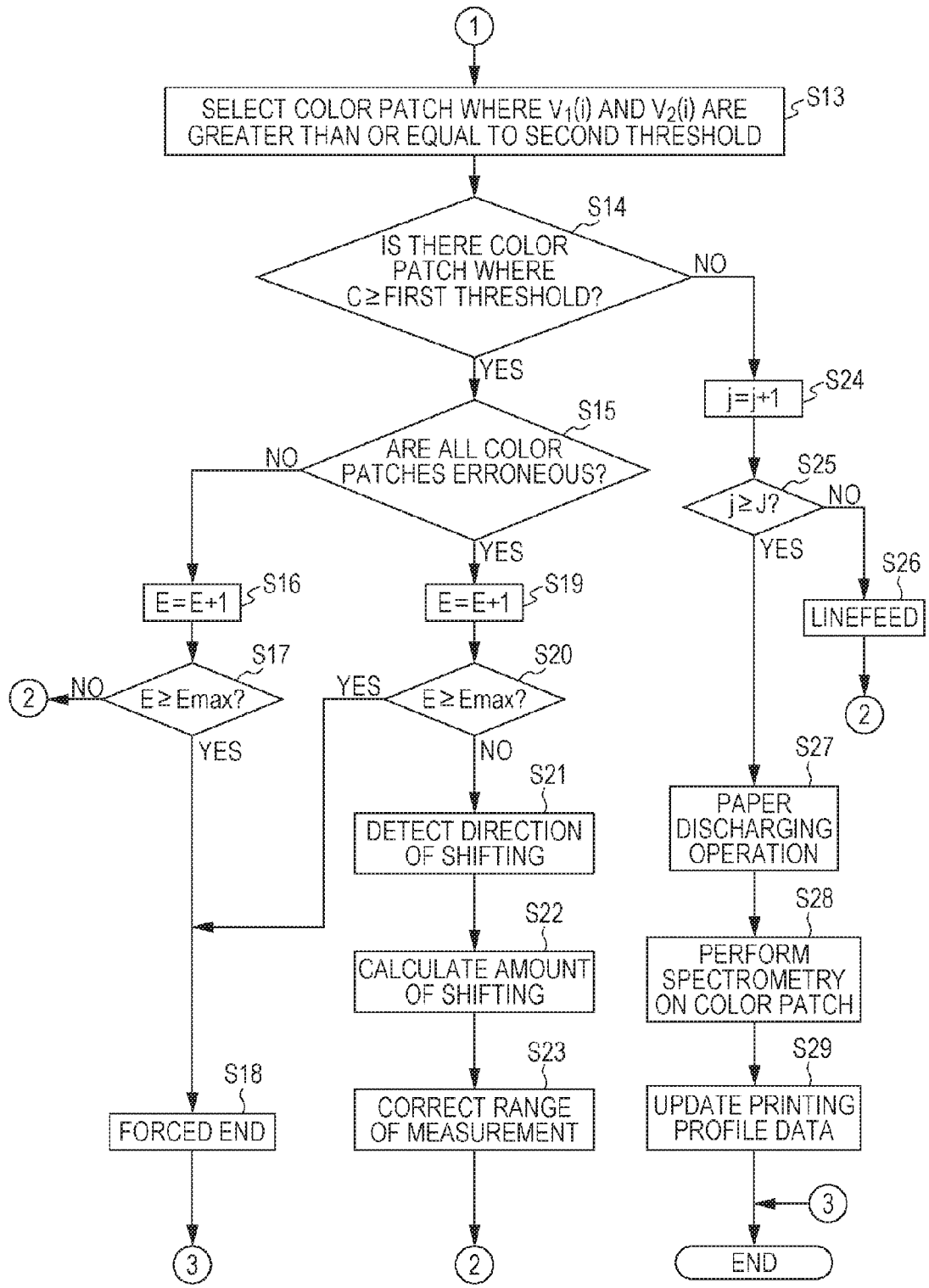
FIG. 7 is a continuation of the flowchart of the spectrometry method of FIG. 6.

FIGS. 6 and 7 are flowcharts illustrating the spectrometry method in the printer 10.

The present embodiment illustrates a measurement target wavelength region as the visible light region from 400 nm to 700 nm and spectrometry as being performed based on the intensity of light in 16 wavelengths from the initial wavelength of 700 nm at an interval of 20 nm.

Formation of Color Chart

In the spectrometry method for the printer 10, first, a color chart including the color patch 31 is formed on the medium A.

In this process, the scanning controller 181 sets the medium A to a predetermined position (Step S1). That is, the scanning controller 181 controls the supply unit 11 and the transport unit 12 to transport the medium A in the sub-scanning direction (+Y direction) and to set a predetermined printing start position in the medium A on the platen 122. The scanning controller 181 moves the carriage 13 to an initial position (for example, a −X side end portion in the main-scanning direction).

The printing controller 182 reads the calibration print data from the memory 153 and prints the color chart on the medium A in synchronization with control of the scanning controller 181 (Step S2).

That is, the scanning controller 181 performs scanning with the carriage 13 to the +X side at, for example, a constant speed. The printing controller 182 specifies the position of the printing unit 16 of the carriage 13 according to the period of time from the start of scanning and forms a dot at a predetermined position based on the calibration print data by causing ink to be discharged from a predetermined color nozzle (i.e., dot forming operation). If the carriage 13 is moved to a +X side end portion, the scanning controller 181 controls the supply unit 11 and the transport unit 12 to transport the medium A in the +Y direction (i.e., transporting operation). Then, the scanning controller 181 performs scanning with the carriage 13 in the −X direction, and the printing controller 182 forms a dot at a predetermined position based on the calibration print data.

Repeating such a dot forming operation and a transporting operation forms the color chart on the medium A.

Figure 8:
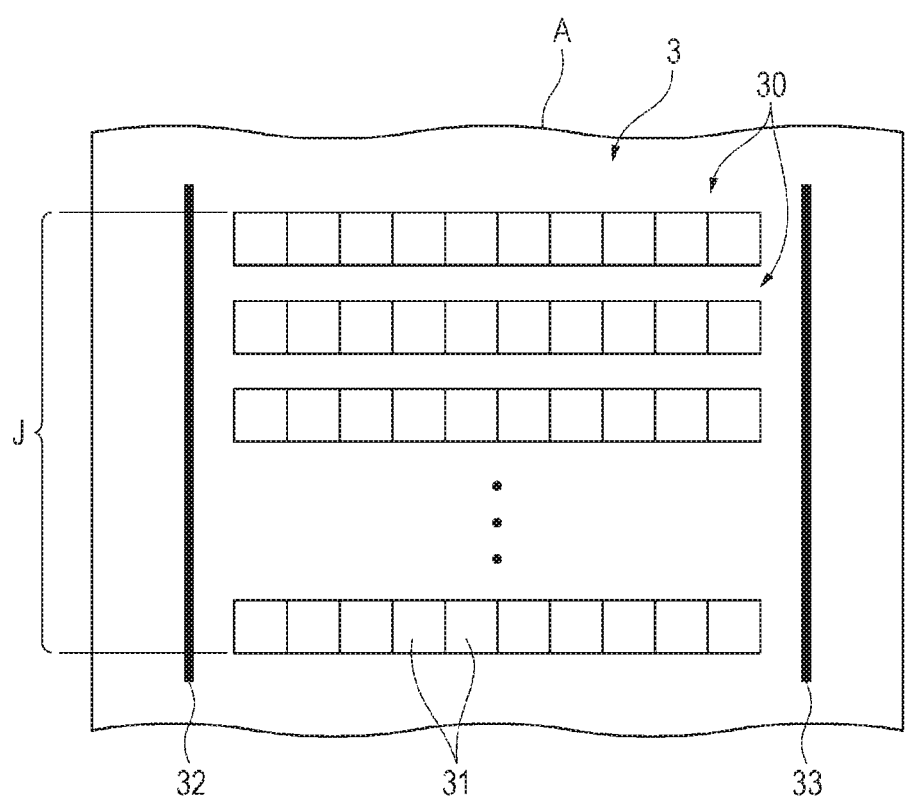
FIG. 8 is a diagram illustrating an example of a color chart in the first embodiment.

FIG. 8 is a diagram illustrating an example of the color chart formed.

In the present embodiment, a color chart 3 in which a color patch group 30 configured by arranging a plurality of color patches 31 of different colors in the X direction with no gaps therebetween is arranged in plural quantities in the Y direction is formed by printing as illustrated in FIG. 8. In the color chart 3, a linear start bar 32 parallel to the Y direction is disposed on the −X side of the color patch groups 30, and a linear goal bar 33 parallel to the Y direction is disposed on the +X side of the color patch groups 30. The start bar 32 and the goal bar 33 are formed to have a color of which the reflectance with respect to the initial wavelength is different from that of the medium A. In the present embodiment, the start bar 32 and the goal bar 33 are formed in black in contrast to the white paper medium A.

In the present embodiment, given that the reflectances of three continuous color patches 31 with respect to the initial wavelength (700 nm in the present embodiment) are $P(i-1)$, $P(i)$, and $P(i+1)$, the color patches 31 satisfying $P(i)-P(i-1)<0$ and $P(i+1)-P(i)<0$ or $P(i)-P(i-1)>0$ and $P(i+1)-P(i)>0$ are formed based on the calibration print data. That is, in the present embodiment, if the output value from the light receiver 173 is observed in a state where scanning is performed with the carriage 13 in the X direction with the transmitted wavelength of the wavelength-selective interference filter 5 fixed to the initial wavelength, the output value is repeatedly increased and decreased each time the color patches 31 are switched, and the output value with respect to the position of the carriage 13 (or the time after the carriage 13 starts to move) forms an output waveform in which peak waveforms and valley waveforms appear alternately.

Initial Setting

Returning to FIG. 6, if ink of the printed color chart 3 dries after Step S2, the scanning controller 181 controls the transport unit 12 to transport the medium A in a −Y direction and to position the first row of the color patches 31 on the line of scanning facing the carriage 13 (measurement target region R) (Step S3).

In the description below, the color patches 31 are arranged into J rows in the Y direction, and a measurement target row number in the color patches 31 is indicated by a variable j (where j is an integer from 1 to J). Since the variable j is set to one in Step S3, the scanning controller 181 transports the medium A in such a manner that the first row color patch group 30 is positioned on the platen 122. In addition, in Step S3, the scanning controller 181 moves the carriage 13 to the −X side end portion (initial position X=0).

After Step S3, a calibration process is performed on the spectroscope 17 (Step S4).

FIG. 9 is a diagram illustrating a relationship among the position of the measurement target region with respect to a color patch, a change in output value, and the time of movement of the carriage. The carriage 13 is positioned at the initial position in the −X side end portion after Step S3. Thus, the measurement target region R is positioned further to the −X side than the start bar 32 as illustrated in FIG. 9.

If white paper is used as the medium A, the control unit 15 performs spectrometry at the initial position on the white paper. That is, the control unit 15 turns on the light source 171A, causes the filter controller 184 to sequentially change the drive voltage applied to the electrostatic actuator 56 of the wavelength-selective interference filter 5, and obtains the output value of the light receiver 173 in each of n bands (e.g., 16 bands) at an interval of 20 nm from the initial wavelength. The control unit 15 measures the output value (i.e., dark voltage) in a state where light is not incident on the light receiver 173. In this process, the output value from the light receiver 173 may be obtained in a state where, for example, the light source 171A is turned off. Alternatively, the output value from the light receiver 173 may be obtained by, for example, disposing a light blocking plate advanceable and retractable on the optical path in the light guide 174 of the spectroscope 17 and blocking incidence of light on the light receiver 173 by using the light blocking plate.

The color measurer 188 performs the calibration process on the spectroscope 17 based on a spectrum of the white paper and the dark voltage. That is, a reference intensity of light (i.e., reference output value) is obtained in each wavelength in a case where light from the light source 171A is reflected by the medium A. In the above example, given that the output value in a wavelength $\lambda$ at the time of measuring the white paper is $Vw(\lambda)$ and that the dark voltage is $Vd$, a reference output value $V_{ref}(\lambda)$ in the wavelength $\lambda$ is calculated from $V_{ref}(\lambda)=Vw(\lambda)-Vd$.

While the present embodiment illustrates the medium A as white paper, other colors may be used. In this case, since the color (reflectance in each wavelength) of the medium A is previously known, the reference output value can be calculated from the output value in each wavelength at the time of calibration. A white color patch as a reference color may be formed on the −X side of the start bar 32 at the time of forming the color chart 3. In this case, if the white color is included as an ink pigment, a white color patch having a known reflectance can be formed independently of the medium A.

In Step S4, calibration of the wavelength-selective interference filter 5 may be performed in addition to obtaining the reference output value $V_{ref}(\lambda)$ used at the time of spectrometry.

That is, since the light emitting characteristics of the light source 171A and the light reception sensitivity characteristics of the light receiver 173 are previously known, a shift between the transmitted wavelength with respect to the applied voltage based on the V–λ data and the transmitted wavelength with respect to the actually applied voltage can be detected by comparing spectral characteristics resulting from multiplying the light emitting characteristics of the light source 171A and the light reception sensitivity characteristics of the light receiver 173 with the waveform of the output value in Step S4. In this case, the wavelength-selective interference filter 5 can be calibrated by, for example, correcting the V–λ data based on a result of measurement.

A correction color patch having a higher reflectance or absorbance in a predetermined wavelength (e.g., the initial wavelength of 700 nm) than in other wavelengths may be formed at the initial position on the medium A. For example, if a correction color patch having a high reflectance only in the initial wavelength is arranged, spectrometry is performed in each wavelength, a determination of whether a voltage at which the peak of the reflectance (initial wavelength) is detected matches the voltage with respect to the initial wavelength recorded in the V–λ is performed. If a shift is present between the voltages, the V–λ data is corrected.

Measurement Area Setting Process

After Step S4, the control unit 15 sets the area of measurement M for measuring each color patch 31 of the color patch groups 30 of the color chart 3 (Step S5).

In the description below, the −X side end portion (minus side end portion) of one color patch 31 in the X direction will be referred to as a first patch end portion 311 and the +X side end portion (plus side end portion) thereof as a second patch end portion 312 as illustrated in FIG. 9. In the present embodiment, the first patch end portion 311 of the i-th color patch 31 in the color patch groups 30 matches the second patch end portion 312 of the (i−1)-th color patch 31, and the second patch end portion 312 of the i-th color patch 31 matches the first patch end portion 311 of the (i+1)-th color patch 31. In the present embodiment, the measurement target region R is a circular spot of a diameter r (measurement width dimension r), and the −X side end portion thereof is referred to as a first measurement region end portion R1 and the +X side end portion thereof as a second measurement region end portion R2. In the present embodiment, the reference point Rb is set to the center of the circle in the measurement target region R.

The color chart 3 is an image formed based on the calibration print data, and as illustrated in FIG. 9, a distance $W_0$ from the start bar 32 to the first color patch and the width dimension (patch width $W_p$) of each color patch 31 in the X direction are set to known values in the color chart 3 printed on the medium A.

The scanning controller 181 performs scanning with the carriage 13 in the X direction in a uniform motion (at the speed v).

The time $T_n$ (i.e., filter drive time) from application of the drive voltage to the electrostatic actuator 56 of the wavelength-selective interference filter 5 until transmission of light of the transmitted wavelength corresponding to the drive voltage can be obtained by measuring the time $T_n$ in advance at the time of, for example, inspecting the wavelength-selective interference filter 5. Therefore, the time necessary for obtaining the intensity of light (i.e., output value) corresponding to n bands is equal to $n \times T_n$, and a measurement distance $W_m$ in which the measurement target region R moves in the X direction during the time is equal to $W_m = v \times (n \times T_n)$. In actual performance of colorimetry, the measurement target region R is required to be included within the region of a color patch 31 during movement thereof in the measurement distance $W_m$. Thus, the area of measurement M is required to satisfy at least the following Expression (1).

$$r + W_m \leq W_p \quad (1)$$

A slight shift in the area of measurement causes either the start position or the end position of the area of measurement to be deviated outside of one color patch 31. For example, a slight shift may be present if the start position of the area of measurement M is set to the position at which the first patch end portion 311 of the color patch matches the first measurement region end portion R1 (position at which the reference point Rb is separated from the first patch end portion 311 by +r/2) and the end portion of the area of measurement M to the position at which the second patch end portion 312 matches the second measurement region end portion R2 (position at which the reference point Rb is separated from the second patch end portion 312 by −r/2). In this case, accurate spectrometry cannot be performed on the color patch 31.

Therefore, in the present embodiment, the area of measurement M is set such that the start position M1 is set to the position separated to the +X side by a predetermined margin $a_1$ (i.e., first distance) from the position at which the first measurement region end portion R1 overlaps with the first patch end portion 311 and that the end position M2 is set to the position separated to the −X side by a predetermined margin $a_2$ (i.e., second distance) from the position at which the second measurement region end portion R2 overlaps with the second patch end portion 312.

Therefore, the measurement range setter 183 sets the area of measurement M by setting the margins $a_1$ and $a_2$ to satisfy the following Equation (2). It is preferable to use the same value as the margins $a_1$ and $a_2$. In actual performance of spectrometry, the direction in which the area of measurement M moves cannot be predicted. Thus, setting the margins $a_1$ and $a_2$ of the same value on the +X side and the −X side can increase the reliability of spectrometry.

$$r + (a_1 + a_2) + W_m = W_p \quad (2)$$

In the present embodiment, the carriage 13 accelerates in an accelerated linear motion from the initial position (X=0) to the start bar 32, then moves in the +X direction in a uniform linear motion at the speed v, and decelerates in an accelerated linear motion and stops after passing the goal bar 33.

Thus, the position of the measurement target region R can be detected by using the time of movement of the carriage 13 in a uniform linear motion at the speed v from the reference position corresponding to the timing at which the measurement target region R passes the start bar 32. That is, in the present embodiment, the measurement range setter 183, as settings for the area of measurement M, calculates the time (measurement start time) in which the reference point Rb of the measurement target region R moves to the start position M1 of each color patch 31 and the time (measurement end time) in which the reference point Rb moves to the end position M2 of each color patch 31. Therefore, the period from the measurement start time until the measurement end time corresponds to a first period of the present disclosure and corresponds to the actual period of time in which spectrometry is performed on the color patch 31.

To describe more specifically, if the wavelength in which light is transmitted through the wavelength-selective interference filter 5 is fixed to a constant wavelength (for example, the initial wavelength of 700 nm), the output value from the light receiver 173 gradually decreases after the second measurement region end portion R2 of the measurement target region R reaches the start bar 32 as illustrated in FIG. 9. The output value has the minimum value when the reference point Rb passes the center of the start bar 32, and then, the output value increases again and returns to the original output value with respect to the white paper at the timing (T=$T_0$) when the first measurement region end portion R1 matches the +X side end portion of the start bar. Therefore, the reference timing $T_0$ corresponding to the reference position can be easily detected based on the waveform of the output value.

The distance from the reference position to the start position M1 of the initial color patch 31 corresponds to "$W_0+a_1$" as illustrated in FIG. 9. Therefore, a measurement start time $T_{m1}(1)$ of movement of the reference point Rb from the position corresponding to the reference timing $T_0$ to the start position M1 in the initial color patch 31 is represented by the following Equation (3), and a measurement end time $T_{m2}(1)$ of movement thereof from the reference position to the end position M2 is represented by the following Equation (4).

$$T_{m1}(1)=(W_0+a_1)/v \tag{3}$$

$$T_{m2}(1)=T_{m1}(1)+W_m v=(W_0+a_1+W_m)/v \tag{4}$$

If the patch width $W_p$ of each color patch 31 is the same, the start position M1 and the end position M2 of the i-th (where i≥2) color patch 31 correspond to the positions moved to the +X side from the start position M1 and the end position M2 of the (i−1)-th color patch 31 by the patch width $W_p$ of each color patch 31. Thus, the time of movement from the position corresponding to the reference timing $T_0$ to the start position M1 and to the end position M2 of the i-th (where i≥2) color patch 31 is respectively represented by the following Equations (5) and (6).

$$T_{m1}(i) = T_{m1}(i-1) + W_p/v \tag{5}$$

$$T_{m2}(i) = T_{m1}(i) + W_m/v$$

$$( = T_{m2}(i-1) + W_p/v) \tag{6}$$

(where $i \geq 2$)

If the dimension of each color patch 31 is different, the margins $a_1(i)$ and $a_2(i)$ are set for the i-th color patch 31 having the patch width $W_p(i)$ to satisfy the following Equation (7). Even in this case, it is preferable to use the same value for $a_1(i)$ and $a_2(i)$.

$$r+(a_1(i)+a_2(i))+W_m=W_p(i) \tag{7}$$

The measurement range setter 183 calculates the measurement start time $T_{m1}(i)$ and the measurement end time $T_{m2}(i)$ for movement of the reference Rb to the start position M1 and to the end position M2 of the i-th color patch 31 based on the following Equations (8) and (9).

$$T_{m1}(i) = T_{m1}(i-1) + (r + W_m + a_2(i-1) + a_1(i))/v \tag{8}$$

$$( = T_{m2}(i-1) + (r + a_2(i-1) + a_1(i))/v)$$

$$T_{m2}(i) = T_{m2}(i-1) + (r + a_2(i-1) + a_1(i) + W_m)/v \tag{9}$$

$$( = T_{m1}(i) + W_m/v)$$

(where $i \geq 2$)

Scanning and Measuring Process

After Step S5, a scanning and measuring process is performed.

Figure 10:
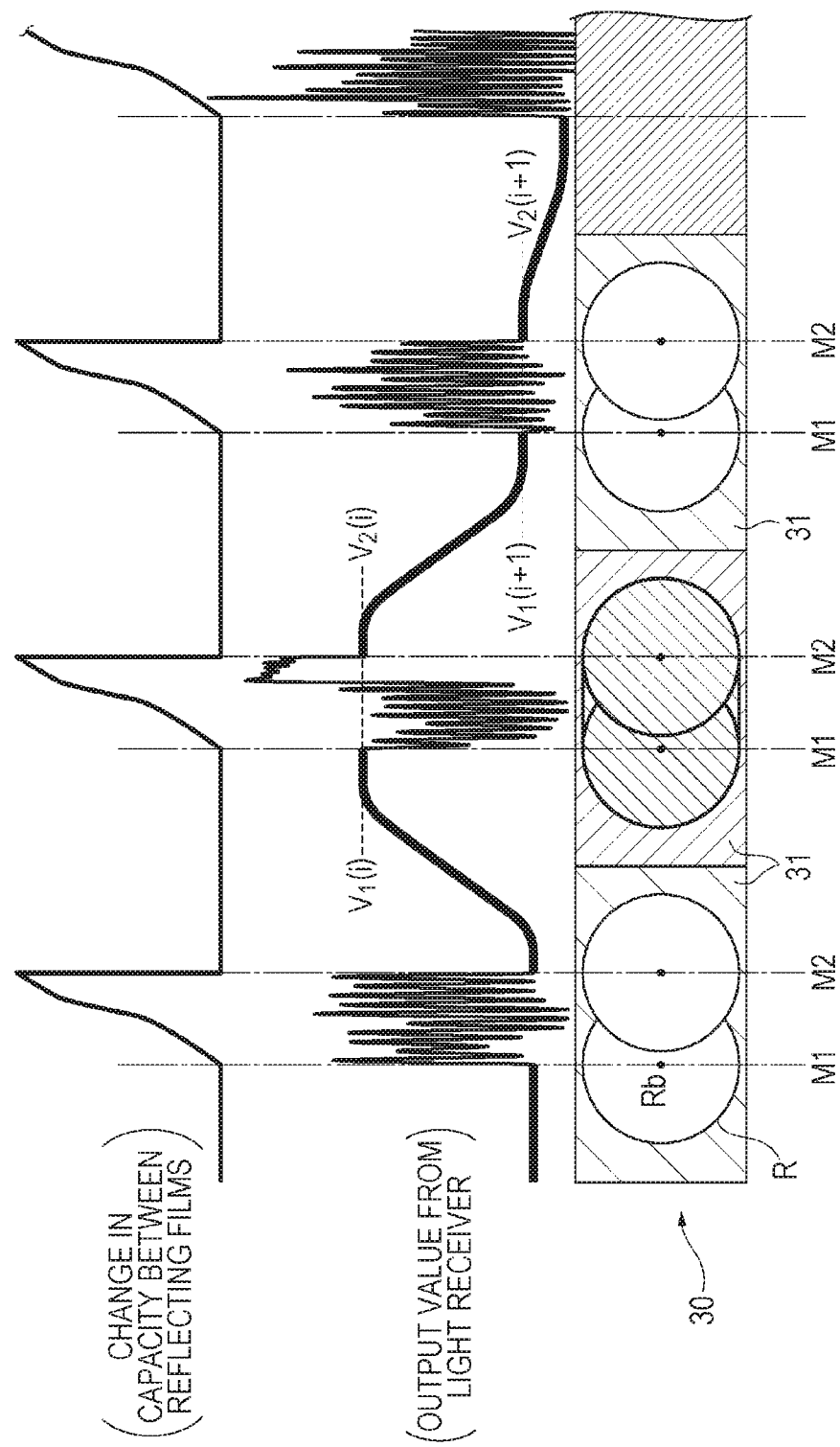
FIG. 10 is a diagram illustrating a position of the measurement target region, a change in output value, and a change in capacity between reflecting films in a case where an area of measurement is not shifted from the color patch in the first embodiment.

FIG. 10 is a diagram illustrating an example of a waveform of the output value in a state where error does not occur.

Figure 11:
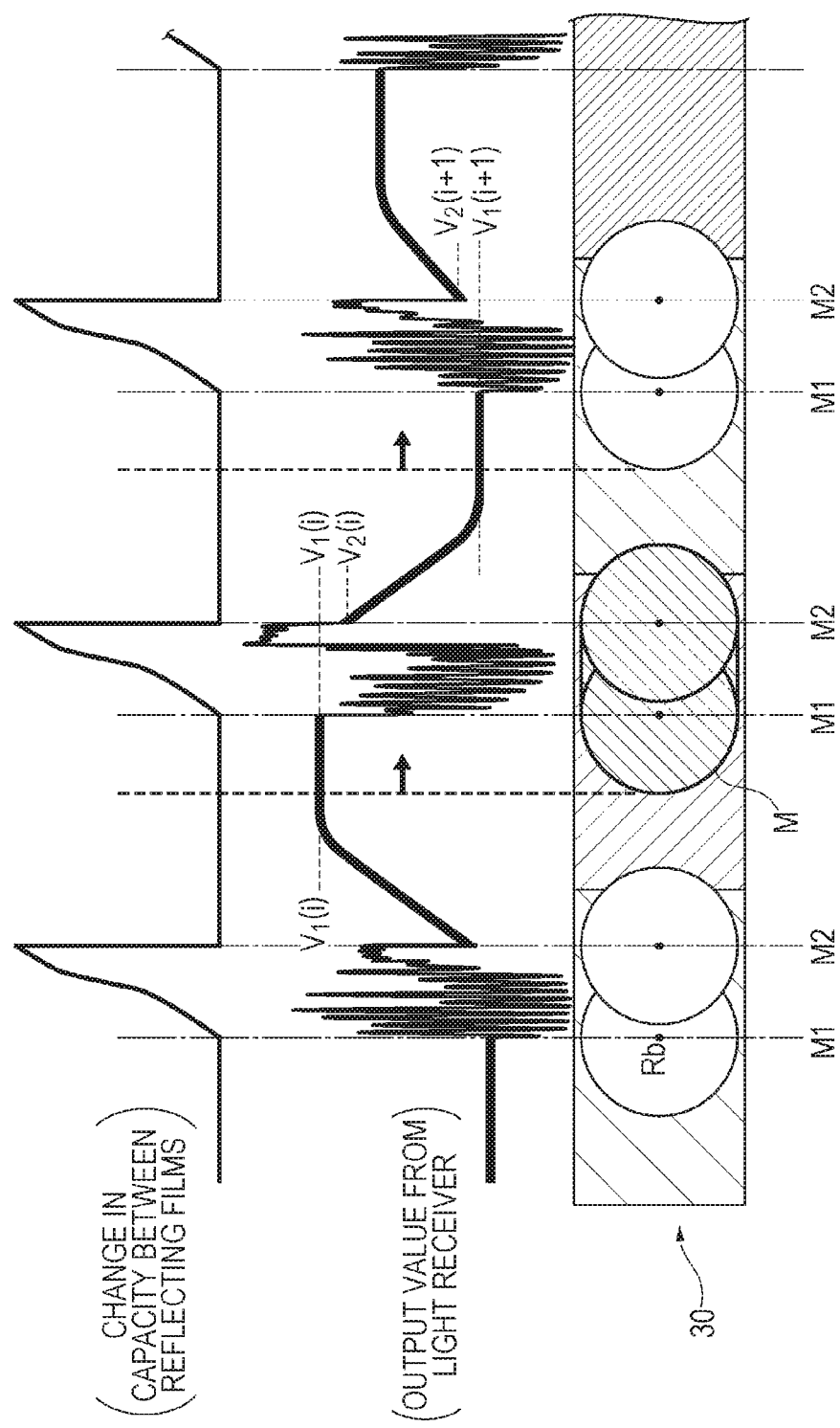
FIG. 11 is a diagram illustrating a position of the measurement target region, a change in output value, and a change in capacity between reflecting films in a case where the area of measurement is shifted from the color patch in the first embodiment.

FIG. 11 is a diagram illustrating an example of a waveform of the output value at the time of occurrence of error.

The lower parts of FIG. 10 and FIG. 11 illustrate the position of the measurement target region R with respect to the color patch 31. The signal waveforms in the middle parts thereof illustrate the waveform of the output value from the light receiver 173 with respect to the position of the measurement target region R. The signal waveforms in the upper parts thereof are signals corresponding to the dimension of the gap between the reflecting films 54 and 55 in the wavelength-selective interference filter 5 and illustrates, for example, a change in electrical capacity when the reflecting films 54 and 55 function as capacity detecting electrodes.

In the scanning and measuring process, the filter controller 184 sets the voltage applied to the electrostatic actuator 56 of the wavelength-selective interference filter to an initial voltage corresponding to the initial wavelength (e.g., 700 nm) that is a first wavelength of the present disclosure (Step S6).

Then, the scanning controller 181 moves the carriage 13 in the X direction (Step S7). The control unit 15 obtains the output value from the light receiver 173 in predetermined sampling cycles and stores the output value in the memory 153. The filter controller 184 monitors the sampled output value, specifies the reference timing $T_0$, and counts an elapsed time t from the reference timing $T_0$ (Step S8).

The filter controller 184 determines whether the elapsed time t from the reference timing $T_0$ is equal to the measurement start time $T_{m1}(i)$ set in Step S5 (Step S9). That is, of the filter controller 184 determines whether the reference point Rb of the measurement target region R is positioned at the start position M1 in the area of measurement M. In other words, whether the reference point Rb is moved to X=$X_{m1}(i)$ (=v×$T_{m1}(i)$) from the initial position of X=0.

If Step S9 is determined as "No", the process waits until the elapsed time t is equal to the measurement start time $T_{m1}(i)$.

If Step S9 is determined as "Yes", the control unit 15 performs spectrometry in the area of measurement M (Step S10). Specifically, the filter controller 184 sequentially changes the voltage applied to the electrostatic actuator 56 based on the V–λ data. Accordingly, the output values with respect to light of n bands in a predetermined wavelength region (e.g., 16 output values with respect to light of wavelengths from 400 nm to 700 nm at an interval of 20 nm) are output to the control unit 15. The control unit 15 appropriately stores these output values in the memory 153.

The filter controller 184 gradually decreases the dimension of the gap G to gradually shorten the transmitted wavelength by gradually increasing the drive voltage applied to the electrostatic actuator 56 as illustrated by the signal waveforms in the upper parts of FIG. 10 and FIG. 11.

Accordingly, the range of change in the gap dimension is decreased, and vibrations can be suppressed at the time of displacement of the movable portion 521. That is, since the filter drive time $T_n$ for switching the transmitted light of the wavelength-selective interference filter 5 can be decreased, the area of measurement M can be decreased, and error resulting from deviation of the area of measurement M from the color patches 31 can be reduced.

While the gap dimension is illustrated as being gradually decreased in the present example, the present embodiment is not limited to this. For example, the initial wavelength may be set to 400 nm (i.e., the initial voltage may be set to the maximum value), and the drive voltage applied to the electrostatic actuator 56 at the time of spectrometry may be gradually decreased to gradually lengthen the transmitted wavelength.

Alternatively, for example, the drive voltage may be switched stepwise when the gap G returns to the gap dimension corresponding to the initial wavelength 700 nm from the gap dimension corresponding to 400 nm at the end of measurement. Further alternatively, the transmitted wavelength may be changed such as being gradually lengthened from 420 nm to 680 nm at an interval of 40 nm after being gradually shortened from the initial wavelength of 700 nm to 400 nm at an interval of 40 nm. In such a case, rapid displacement of the movable portion 521 is suppressed when the transmitted wavelength returns to the initial wavelength after the end of spectrometry. Therefore, vibration of the movable portion 521 can be more effectively suppressed, and a change in the second output value $V_2(i)$ at the end position M2 can be suppressed.

The filter controller 184 determines whether the elapsed time t from the reference timing $T_0$ is equal to the measurement end time $T_{m2}(i)$ set in Step S5. In other words, whether the reference point Rb is moved to $X=X_{m2}(i)$ ($=v \times T_{m2}(i)$) (Step S11).

If Step S11 is determined as "No", the process waits until the elapsed time is equal to the measurement end time $T_{m2}(i)$.

If Step S11 is determined as "Yes", the filter controller 184 restores the voltage applied to the electrostatic actuator 56 to the initial voltage and causes light of the initial wavelength to be transmitted through the wavelength-selective interference filter 5.

If spectrometry with respect to light of n bands ends before the elapsed time t is equal to the measurement end time $T_{m2}(i)$, the filter controller 184 may restore the voltage applied to the electrostatic actuator 56 to the initial voltage at the end of spectrometry.

The control unit 15 determines whether the spectrometry process is completed on all color patches 31 in the color patch group 30 arranged in the j-th row (Step S12). In this process, the number of times the spectrometry process is performed may be counted, and a determination of whether the counted number is equal to a total number I of color patches 31 arranged in the color patch group 30 may be performed. Alternatively, a determination of whether the carriage 13 passes the goal bar 33 may be performed.

If Step S12 is determined as "No", the process returns to Step S9.

Error Determination Process

The process proceeds to an error determination process illustrated in FIG. 7 if Step S12 is determined as "Yes". The determiner 185 determines whether the area of measurement M is included within the region of corresponding one color patch 31 based on a spectrometry result for each color patch 31 stored in the memory 153.

Specifically, the determiner 185 references the spectrometry result for each color patch 31 and selects the color patch 31 in which the first output value $V_1(i)$ output from the light receiver 173 in the start position M1 and the second output value $V_2(i)$ output from the light receiver 173 in the end position M2 are greater than or equal to a predetermined second threshold (Step S13). The second threshold may be set to a value, for example, that distinguishes between a noise component and the detection signal from the light receiver 173.

Next, the determiner 185 calculates the absolute value ($|V_1(i)-V_2(i)|$) of the difference between the first output value $V_1(i)$ and the second output value $V_2(i)$ in each selected color patch 31 as an error determination value C and determines whether there is a color patch 31 in which the error determination value C is greater than or equal to a predetermined first threshold (Step S14).

That is, since the wavelength of light transmitted through the wavelength-selective interference filter 5 is set to the same wavelength at the start position M1 and at the end position M2, the first output value $V_1(i)$ and the second output value $V_2(i)$ are expected to be either the same or approximately the same as illustrated in FIG. 10 provided that the area of measurement M is included within the region of a color patch 31, and the error determination value C that is the difference value therebetween is expected to be small.

However, if the speed of movement or the position of the carriage 13 is changed or if the position of installation of the medium A is changed by, for example, vibrations exerted in the printer 10, the position of the area of measurement M may be shifted with respect to a color patch 31 as illustrated in FIG. 11, and a part of the area of measurement M may be deviated from the color patch 31. In this case, the first output value $V_1(i)$ and the second output value $V_2(i)$ have different values, and the error determination value C is increased.

Therefore, by determining whether the error determination value C is greater than or equal to the first threshold, a determination of whether the area of measurement M is included within the region of each color patch 31 (i.e., whether the area of measurement M is positionally shifted with respect to each color patch 31) can be performed.

The first threshold may be set based on, for example, the range of change in transmitted wavelength due to vibrations exerted in the optical filter device 172 or resonance of the movable portion 521 caused by driving of the electrostatic actuator 56. For example, as in the enlarged waveform diagram illustrated in FIG. 9, the signal waveform at the time of sampling of the output value corresponds to a waveform that vibrates with a minute amplitude. Therefore, the first threshold may be set to a difference α between the maximum amplitude and the minimum amplitude of the minute vibration as illustrated in FIG. 9.

If Step S14 is determined as "Yes" (i.e., if there is a color patch 31 in which the error determination value C is greater than or equal to the first threshold), a determination of whether the color patch 31 determined to have error corresponds to all color patches 31 selected in Step S13 is performed (Step S15).

That is, if the area of measurement M is positionally shifted with respect to the color patches 31 as described above, the first output value $V_1(i)$ and the second output value $V_2(i)$ have different values in the spectrometry result for all color patches 31, and error is expected to be output in all color patches 31.

Regarding this matter, if the error determination value C is greater than or equal to the first threshold only in a part of the color patches 31 (if Step S15 is determined as "No"), it is predicted that error is incidentally caused by, for example, electrical noise or disturbance noise due to mechanical vibration.

In this case, the determiner 185 may, for example, add "1" to an error counter value E (initial value of E=0) stored in the memory 153 (Step S16) and determine whether the error counter value E exceeds a predetermined maximum value Emax (e.g., "4") (Step S17).

The process returns to Step S6 if Step S17 is determined as "No". That is, if incidental error occurs as described above, it is determined that the error is not caused by positional shifting of the area of measurement, and spectrometry is started again.

Meanwhile, if Step S17 is determined as "Yes", it can be determined that there are other causes of error, and a forced end process is performed (Step S18). That is, if incidental error occurs many times even in a case where Step S15 is determined as "No", other causes of error are considered to exist.

In the forced end process, the scanning controller 181 controls the supply unit 11 and the transport unit 12 to forcefully discharge the medium A. In addition, the occurrence of error at the time of spectrometry is reported. For example, the occurrence of error is notified by, for example, displaying on a display (not illustrated) or displaying on the external apparatus 20 such as a personal computer connected to the printer 10 or by audio.

Meanwhile, if Step S15 is determined as "Yes" (i.e., if the error determination value C is greater than or equal to the first threshold in the spectrometry result for all color patches 31), the determiner 185 adds "1" to the error counter value E as in Step S16 (Step S19).

Then, the determiner 185 determines whether the error counter E exceeds the predetermined maximum value Emax (for example, "4") as in Step S17 (Step S20).

If Step S20 is determined as "Yes", the process transitions to the forced end process of Step S18.

Meanwhile, if Step S20 is determined as "No", the process transitions to an error restoration process.

Error Restoration Process

In the error restoration process, first, the shifting direction detector 187 performs a shifting direction detecting process (Step S21).

Shifting Direction Detecting Process

FIGS. 12A and 12B and FIGS. 13A and 13B are diagrams illustrating an example of the signal waveform of the output value when the area of measurement M is shifted with respect to a color patch 31.

In the present embodiment, as described above, the color patch group 30 is formed to include three adjacent color patches 31 of which the reflectances with respect to the initial wavelength are alternatively increased and decreased.

Figure 12A:
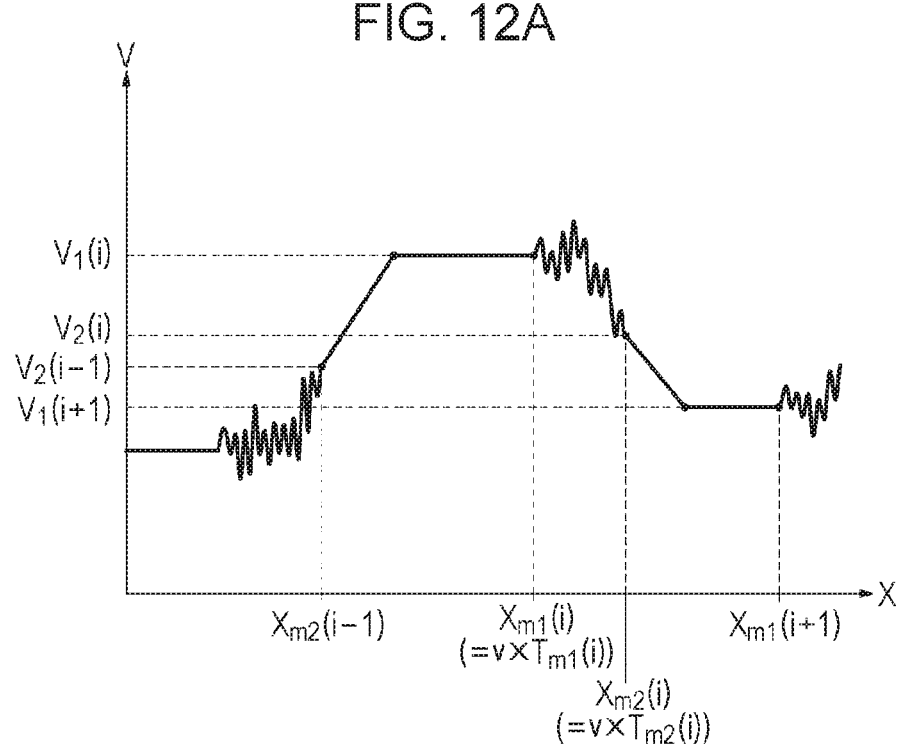
FIGS. 12A and 12B are diagrams illustrating an example of a signal waveform of the output value in a case where the area of measurement is shifted in the first embodiment.
Figure 12B:
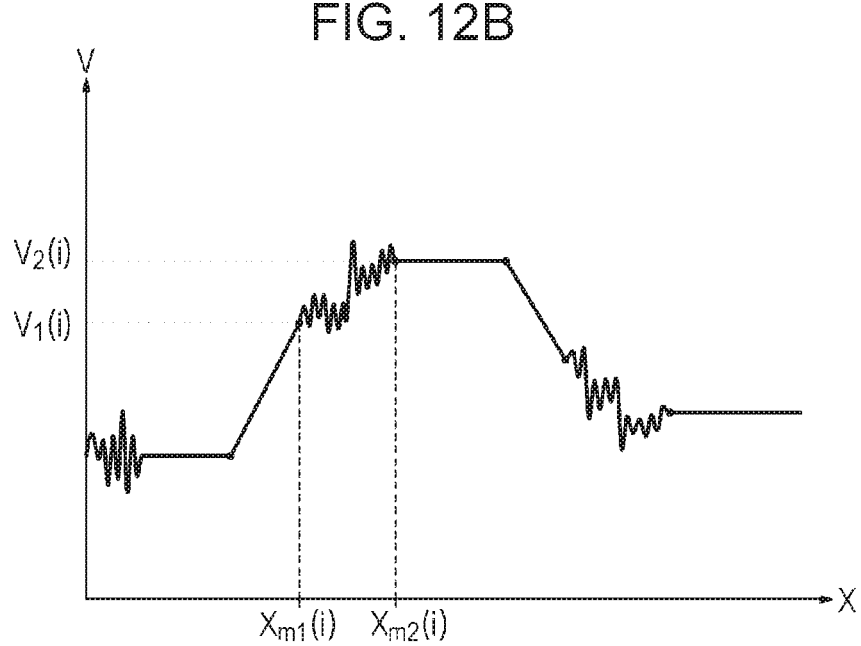

Therefore, if the reflectance of the i-th color patch 31 with respect to the initial wavelength is greater than those of the (i−1)-th and (i+1)-th color patches 31, a spectrometry result (change in output value) including a peak (protruding shape) waveform is obtained as in FIGS. 12A and 12B. Meanwhile, if the reflectance of the i-th color patch 31 with respect to the initial wavelength is smaller than those of the adjacent (i−1)-th and (i+1)-th color patches 31, a spectrometry result including a valley (recessed shape) waveform is obtained as in FIGS. 13A and 13B.

In Step S21, the shifting direction detector 187 first determines whether a change in output value with respect to the i-th color patch 31 has a peak (protruding shape) or a valley (recessed shape) based on the calibration print data. That is, since each color patch 31 is formed based on the calibration print data, a determination of whether the reflectance of the i-th color patch 31 with respect to the initial wavelength is greater or smaller than those of the (i−1)-th and (i+1)-th color patches 31 can be easily performed based on the calibration print data.

While the above description provides the calibration print data as storing a relationship between the reflectance of each color patch, the present embodiment is not limited to this.

Figure 13A:
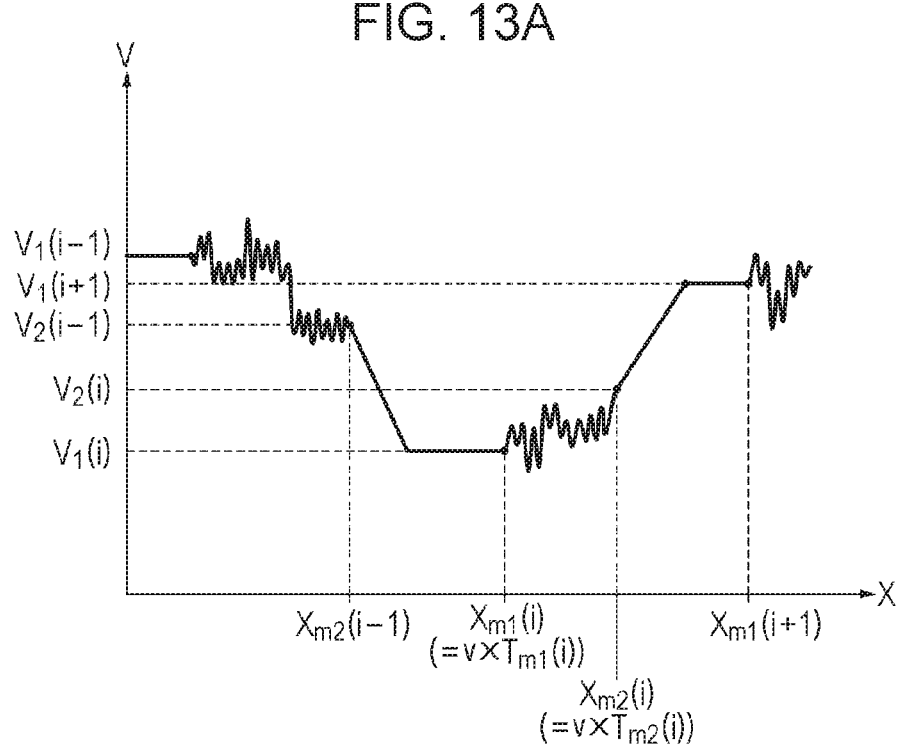
FIGS. 13A and 13B are diagrams illustrating an example of the signal waveform of the output value in a case where the area of measurement is shifted in the first embodiment.

For example, as illustrated in FIG. 12A and FIG. 13A, a determination of whether a change in output value has a peak or a valley may be performed based on the second output value $V_2(i-1)$ with respect to the (i−1)-th color patch 31, the first output value $V_1(i)$ with respect to the i-th color patch 31, the second output value $V_2(i)$ with respect to the i-th color patch 31, and the first output value $V_1(i+1)$ with respect to the (i+1)-th color patch 31.

Specifically, the shifting direction detector 187 determines that a change in output value has a peak (protruding shape) if the conditions in the following Expressions (10) to (12) are satisfied.

$$V_1(i) > V_2(i-1) \tag{10}$$

$$V_1(i) > V_1(i+1) \tag{11}$$

$$V_2(i) > V_1(i+1) \tag{12}$$

The shifting direction detector 187 determines that a change in output value has a valley (recessed shape) if the conditions in the following Expressions (13) to (15) are satisfied.

$$V_1(i) < V_2(i-1) \tag{13}$$

$$V_2(i) < V_2(i-1) \tag{14}$$

$$V_2(i) < V_1(i+1) \tag{15}$$

The shifting direction detector 187 determines that the direction of positional shifting is to the +X side (i.e., measurement start time is too late) if a change in output value has a peak and a relationship between the first output value $V_1(i)$ and the second output value $V_2(i)$ with respect to the i-th color patch 31 satisfies $V_1(i) > V_2(i)$ as illustrated in FIG. 12A.

The shifting direction detector 187 determines that the direction of positional shifting is to the −X side (i.e., measurement start time is too early) if a change in output value has a peak and a relationship between the first output value $V_1(i)$ and the second output value $V_2(i)$ satisfies $V_1(i) < V_2(i)$ as illustrated in FIG. 12B.

Meanwhile, the shifting direction detector 187 determines that the direction of positional shifting is to the +X side (i.e., measurement start time is too late) if a change in output value has a valley and a relationship between the first output value $V_1(i)$ and the second output value $V_2(i)$ with respect to the i-th color patch 31 satisfies $V_1(i) < V_2(i)$ as illustrated in FIG. 13A.

Figure 13B:
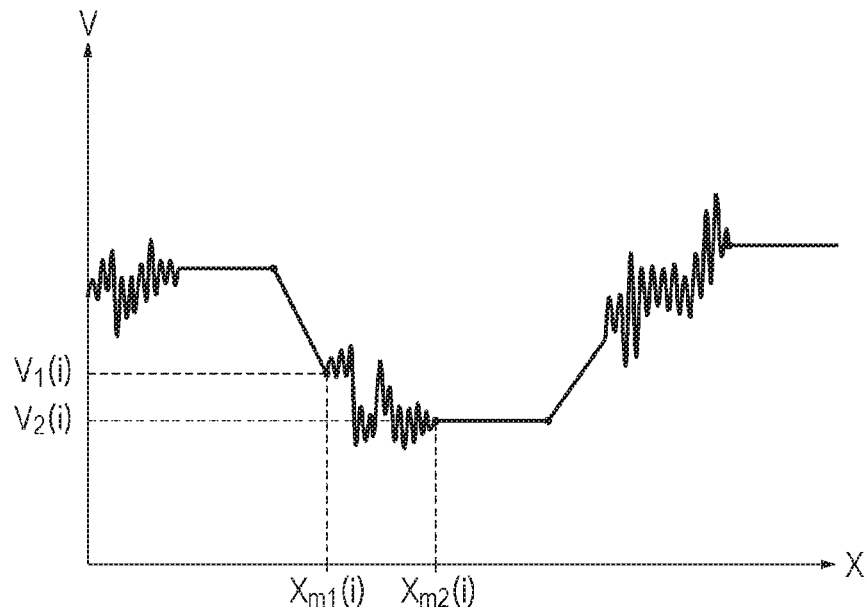

The shifting direction detector 187 determines that the direction of positional shifting is to the −X side (i.e., measurement start time is too early) if a change in output value has a valley and a relationship between the first output value $V_1(i)$ and the second output value $V_2(i)$ satisfies $V_1(i) > V_2(i)$ as illustrated in FIG. 13B.

Shifting Amount Calculating Process

After Step S21, the shifting amount calculator 186 calculates the amount of shifting with respect to the color patch 31 in the area of measurement M (Step S22).

Hereinafter, an example of a shifting amount calculation method using the shifting amount calculator 186 will be described.

Figure 14A:
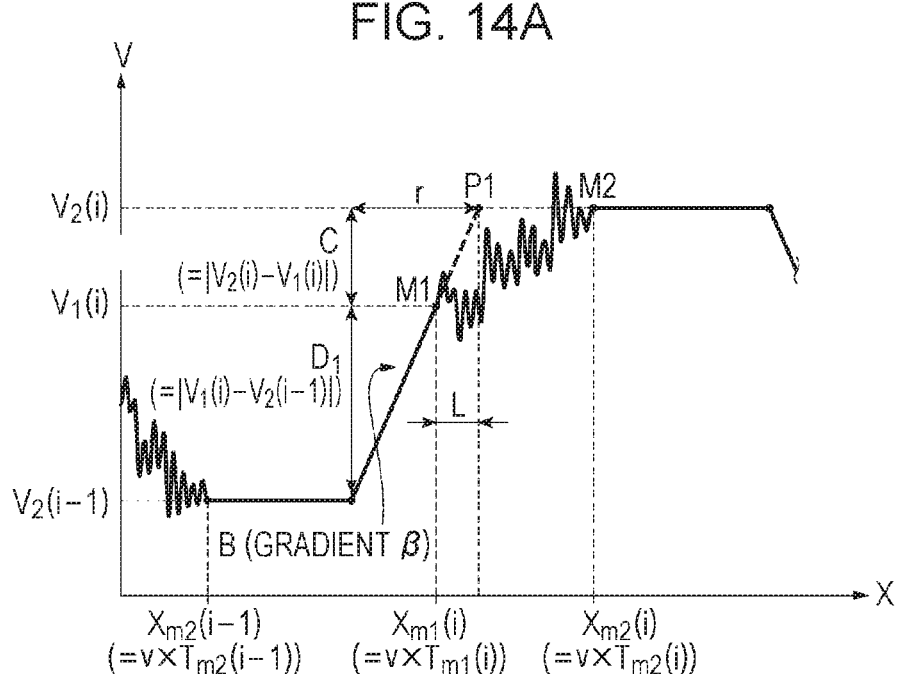
FIGS. 14A and 14B are diagrams in which a part of the signal waveform of the output value in a case where the area of measurement is shifted is enlarged in the first embodiment.
Figure 14B:
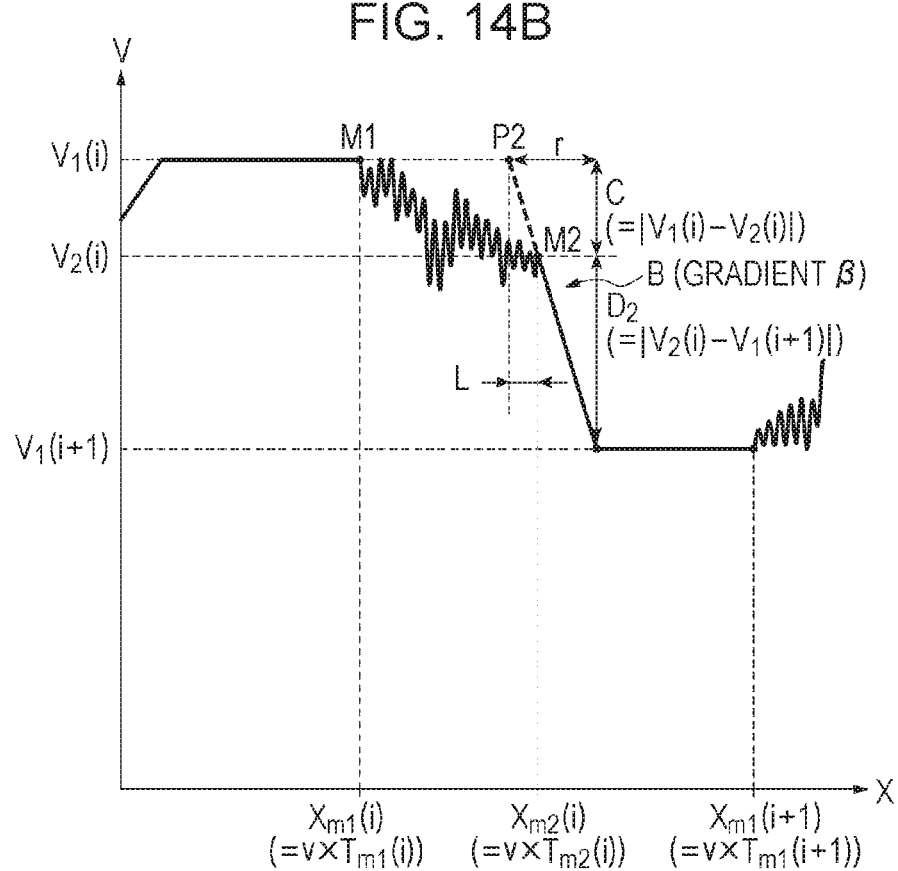

FIGS. 14A and 14B are diagrams in which a part of the waveform of the output value in a case where error is detected is enlarged. FIG. 14A is a signal waveform in a case where the area of measurement M is shifted to the −X side, and FIG. 14B is a signal waveform in a case where the area of measurement is shifted to the +X side.

If the measurement target region R is moved to another adjacent color patch 31 in a state where the transmitted wavelength of the wavelength-selective interference filter 5 is set to the initial wavelength, the output value from the light receiver 173 changes substantially linear provided that the area of the measurement target region R is sufficiently small and that the speed v of movement of the carriage 13 is high.

The distance of a linear portion B in the X direction is equal to the width dimension (diameter r) of the measurement target region R if the area of measurement M is included within the region of the color patch 31. However, if the area of measurement M is positionally shifted and is not included within the region of the color patch 31, the distance of the linear portion B in the X direction is decreased.

Therefore, if the area of measurement M is shifted to the −X side, a distance L from a point P1 at which the distance of the linear portion B in the X direction is equal to the diameter r to the start position M1 corresponds to the amount of movement necessary for inclusion of the area of measurement M within the region of the color patch 31 as illustrated in FIG. 14A. If the area of measurement M is shifted to the +X side, the distance L from a point P2 at which the distance of the linear portion B in the X direction is equal to the diameter r to the end position M2 corresponds to the amount of movement necessary for inclusion of the area of measurement M within the region of the color patch 31 as illustrated in FIG. 14B.

If the area of measurement M is positionally shifted to the −X side, a gradient β of the linear portion B can be calculated as $\beta=(C+D_1)/r$ by using the error determination value C and an absolute value $D_1$ of the difference between the i-th first output value $V_1(i)$ and the (i−1)-th second output value $V_2(i-1)$ $(=|V_1(i)-V_2(i-1)|)$ as illustrated in FIG. 14A.

If the area of measurement M is positionally shifted to the +X side, the gradient β can be calculated as $\beta=(C+D_2)/r$ by using the error determination value C and an absolute value $D_2$ of the difference between the i-th second output value $V_2(i)$ and the (i+1)-th first output value $V_1(i+1)$ $(=|V_2(i)-V_1(i+1)|)$ as illustrated in FIG. 14B.

That is, the gradient β of the linear portion B can be calculated based on the output values at the start position M1 and at the end position M2 with respect to two adjacent color patches 31.

The distance L of movement necessary for inclusion of the area of measurement M within the region of the color patch 31 corresponds to L=C/β using the gradient β of the linear portion B and the error determination value C if the area of measurement M is shifted to the −X side. Since no margin is secured if the start position M1 is moved by the distance L to the +X side, the start position M1 is moved by $L+a_1$ $(=x_{c1})$ to the +X side, considering the margin, to move the area of measurement M to the originally set position.

That is, the shifting amount calculator 186 calculates the amount of shifting $x_{c1}$ based on the output values $V_1(i)$, $V_2(i)$, and $V_2(i-1)$, the diametral dimension r of the measurement target region R, and the margin $a_1$ if the area of measurement M is shifted to the −X side.

The distance L of movement necessary for inclusion of the area of measurement M within the region of the color patch 31 corresponds to L=C/β using the gradient β of the linear portion B and the error determination value C if the area of measurement M is shifted to the +X side. In this case, the end position M2 is moved by $L+a_2$ $(=x_{C2})$ to the −X side, considering the margin $a_2$, to move the area of measurement M to the originally set position. That is, the shifting amount calculator 186 calculates the amount of shifting $x_{C2}$ based on the output values $V_1(i)$, $V_2(i)$, and $V_1(i+1)$, the diametral dimension r of the measurement target region R, and the margin $a_2$ if the area of measurement M is shifted to the +X side.

Measurement Area Correction

After the shifting direction detecting process of Step S21 and the shifting amount calculating process of Step S22, the measurement range setter 183 corrects the position of the area of measurement M, the measurement start time $T_{m1}(i)$, and the measurement end time $T_{m2}(i)$ based on the direction of shifting detected in Step S21 and the amount of shifting calculated in Step S22 (Step S23).

Specifically, if the direction of shifting is to the −X side, this means that the measurement start time is early. Thus, the measurement range setter 183 increases the measurement start time by $x_{C1}/v$.

If the direction of shifting is to the +X side, this means that the measurement start time is too late. Thus, the measurement range setter 183 decreases the measurement start time by $x_{C2}/v$.

That is, given that the previously set measurement start time is $T_{M1}(i)$ and the previously set measurement end time is $T_{M2}(i)$, the measurement range setter 183 corrects the measurement start time $T_{m1}(i)$ and the measurement end time $T_{m2}(i)$ as in the following Equations (16) to (19).

(If the direction of shifting is to the −X side)

$$T_{m1}(i)=T_{M1}(i)+x_{C1}/v \qquad (16)$$

$$T_{m2}(i)=T_{M2}(i)+x_{C1}/v \qquad (17)$$

(If the direction of shifting is to the +X side)

$$T_{m1}(i)=T_{M1}(i)-x_{C2}/v \qquad (18)$$

$$T_{m2}(i)=T_{M2}(i)-x_{C2}/v \qquad (19)$$

The process returns to Step S6, and the scanning and measuring process is started again based on the newly set measurement start time as $T_{m1}(i)$ and the newly set measurement end time as $T_{m2}(i)$.

Linefeed Process

If Step S14 is determined as "No" and the error determination value C is determined to be less than or equal to the first threshold (no error occurs) for all color patches 31 in the j-th row color patch group 30 of the color chart 3, the scanning controller 181 adds "1" to the variable j (Step S24) and determines whether the variable j is greater than or equal to the maximum value J corresponding to the last row of the color patch groups 30 (Step S25).

If Step S25 is determined as "No", the scanning controller 181 transports the medium A in such a manner that the j-th row color patch group 30 is positioned on the platen 122 (Step S26). Then, the process returns to Step S6. If the patch width $W_p$ of each color patch 31 is different for each color patch group 30, the process returns to Step S5 after Step S26, and the area of measurement M is set.

Colorimetry Process and Profile Update Process

If Step S25 is determined as "Yes" (if the spectrometry process is completed on all color patches 31 in the color chart 3 without error), the scanning controller 181 controls the transport unit 12 to perform a paper discharging operation and discharges the medium A (Step S27).

The color measurer 188 calculates the reflectance of each color patch in each wavelength based on the output value in each wavelength obtained for each color patch and the reference output value $V_{ref}(\lambda)$ obtained in Step S4 (Step S28). That is, the color measurer 188 performs a colorimetry process on each color patch and calculates the intensity of color.

Then, the calibrator 189 updates the printing profile data stored in the memory 153 based on the intensity of color of each color patch recorded in the calibration print data and the intensity of color calculated in Step S28 (Step S29).

Effect of Present Embodiment

In the present embodiment, the carriage moving unit 14 moves the measurement target region R of the spectroscope 17 in the X direction with respect to the color patches 31 disposed on the medium A by moving in the X direction the carriage 13 in which the spectroscope 17 including the wavelength-selective interference filter 5 is included.

The control unit 15 changes the wavelength of light transmitted through the wavelength-selective interference filter 5 by using the filter controller 184 according to the position of the measurement target region R with respect to the set area of measurement M. That is, the filter controller 184 applies the initial voltage to the electrostatic actuator 56 of the wavelength-selective interference filter 5 to set the transmitted wavelength to the initial wavelength at the start of measurement when the reference point Rb of the measurement target region R is positioned at the start position M1 of the area of measurement M and at the end of measurement when the reference point Rb is positioned at the end position M2 while scanning is performed with the carriage 13 in the X direction. Furthermore, the filter controller 184 sequentially switches the voltage applied to the electrostatic actuator 56 to sequentially change the transmitted wavelength during the period (first period) of movement of the reference point Rb of the measurement target region R within the area of measurement M from the start position M1 to the end position M2.

Then, the determiner 185 compares the first output value $V_1(i)$ from the light receiver 173 when the measurement target region R is positioned at the start position M1 with the second output value $V_2(i)$ from the light receiver 173 when the measurement target region R is positioned at the end position M2.

As such, by comparing the first output value $V_1(i)$ with the second output value $V_2(i)$, it is possible to easily determine whether the area of measurement M is set to an appropriate position with respect to the color patches 31. In addition, since spectrometry can be performed in the area of measurement M in a state where the carriage 13 is moved, high speed spectrometry can be performed compared with, for example, a case where spectrometry is performed after the carriage 13 stops on the color patches 31.

In addition, since the first output value $V_1(i)$ from the light receiver 173 is compared with the second output value $V_2(i)$, processing is facilitated compared with, for example, a case of using the reflectance with respect to the first wavelength ($V_1(i)/V_{ref}(\lambda)$) calculated by the color measurer 188, and a determination of whether the area of measurement M is appropriate can be performed at a high speed.

If the area of measurement M is determined to be included in the region of the color patch 31 from the result of the determination, the color measurer 188 performs the colorimetry process on the color patch 31 based on each output value that is output when the measurement target region R moves in the area of measurement M. Thus, colorimetry can be performed with high accuracy based on the spectrometry result with respect to the region of the color patch 31.

In the present embodiment, the determiner 185 determines that the area of measurement M is positioned within the region of the color patch 31 if the absolute value of the difference between the first output value $V_1(i)$ and the second output value $V_2(i)$ (e.g., error determination value C) is less than or equal to the first threshold. Accordingly, the determiner 185 can easily determine whether the area of measurement M is set to an appropriate position by comparing the error determination value C with the first threshold. In addition, since the output value from the light receiver 173 is output in the waveform of minute vibrations due to electrical noise, noise from mechanical vibrations, or the like, setting the first threshold to the value α considering the noise can prevent erroneous detection of error compared with, for example, determining whether the difference between the first output value $V_1(i)$ and the second output value $V_2(i)$ is equal to "0", and processing efficiency can be improved.

In the present embodiment, the determiner 185 selects, from the plurality of color patches 31 lined up in the X direction, the color patch 31 in which the first output value $V_1(i)$ and the second output value $V_2(i)$ are greater than or equal to the second threshold and determines positional shifting of the area of measurement M based on the first output value $V_1(i)$ and the second output value $V_2(i)$ in the selected color patch 31.

Accordingly, positional shifting of the area of measurement M can be accurately determined based on a high signal level output value that is unlikely to be affected by noise and excluding a low signal level output value that is likely to be affected by noise.

In the present embodiment, the start position M1 is set to the position separated by $r/2+a_1$ to the +X side from the first patch end portion 311 of the color patch 31, and the end position M2 is set to the position separated by $r/2+a_2$ to the −X side from the second patch end portion 312. That is, the margin $a_1$ is disposed between the reference point Rb at the time of complete inclusion of the measurement target region R within the region of the color patch 31 and the start position M1, and the margin $a_2$ is disposed between the end position M2 and the reference point Rb at the time immediately before the measurement target region R passes outside of the color patch 31.

By disposing such margins $a_1$ and $a_2$, even if the position of the area of measurement M is slightly shifted with respect to the color patch 31 but within the margins $a_1$ and $a_2$, spectrometry can be normally performed on the color patch 31 with no output of error, and the colorimetry process can be accurately performed by the color measurer 188 on each color patch 31.

The present embodiment includes the shifting direction detector 187 that detects the direction of positional shifting if the determiner 185 determines that the area of measurement M is positionally shifted with respect to the color patch 31. Accordingly, a determination of the direction in which the previously set area of measurement M is to be moved, that is, a determination of whether the measurement start time $T_{m1}(i)$ and the measurement end time $T_{m2}(i)$ are to be decreased or increased can be easily performed. Therefore, the measurement range setter 183 can easily reset the position of the area of measurement M, and the error restoration process can be performed at a high speed.

In the present embodiment, the shifting direction detector 187 obtains the reflectances of the i-th color patch 31 and the preceding and succeeding adjacent (i−1)-th and (i+1)-th color patches 31 with respect to the initial wavelength. The shift direction detector 187 detects the direction of positional shifting based on the reflectances, the first output value $V_1(i)$, and the second output value $V_2(i)$.

That is, based on the reflectances of the color patch 31 and the colors around the color patch 31 with respect to the initial wavelength, the shifting direction detector 187 can determine whether the output value has a peak waveform or a valley waveform at the time of scanning with the carriage 13 in the X direction in a state where the wavelength of the transmitted light of the wavelength-selective interference filter 5 is fixed to the initial wavelength. Then, if the output value has a peak waveform, it can be determined that the direction of positional shifting is to the +X side in a case of $V_1(i) > V_2(i)$ and that the direction of positional shifting is to the −X side in a case of $V_1(i) < V_2(i)$. If the output value has a valley waveform, it can be determined that the direction of positional shifting is to the −X side in a case of $V_1(i) > V_2(i)$ and that the direction of positional shifting is to the +X side in a case of $V_1(i) < V_2(i)$. That is, the shifting direction detector 187 can easily detect the direction of positional shifting by using the first output value $V_1(i)$ and the second output value $V_2(i)$ for determination of the positional shifting of the area of measurement M provided that the signal waveform of the output value can be discriminated.

In the present embodiment, the shifting amount calculator 186 calculates the amount of positional shifting of the area of measurement M with respect to the color patch 31.

Accordingly, the amount of movement of the area of measurement M is previously calculated at the time of resetting the area of measurement M by using the measurement range setter 183. Thus, the area of measurement M can be reset (corrected) to an appropriate position based on the calculated amount.

In the present embodiment, the shifting amount calculator 186 calculates the amount of shifting based on the measurement width diameter r, the first output value $V_1(i)$, the second output value $V_2(i)$, and the first output value $V_1(i+1)$ if the area of measurement M is positionally shifted to the +X side. If the area of measurement M is positionally shifted to the −X side, the shifting amount calculator 186 calculates the amount of shifting based on the measurement width diameter r, the first output value $V_1(i)$, the second output value $V_2(i)$, and the second output value $V_2(i−1)$.

That is, the shifting amount calculator 186 can easily calculate the amount of shifting based on the first output value $V_1(i)$ and the second output value $V_2(i)$ for determining the positional shifting of the area of measurement M with respect to each color patch 31.

In the present embodiment, when the carriage 13 moves in a uniform linear motion, the measurement range setter 183 calculates the measurement start time $T_{m1}(i)$ that is the amount of time in which the measurement target region R moves to the start position M1 and the measurement end time $T_{m2}(i)$ that is the amount of time in which the measurement target region R moves to the end position M2.

In this case, the position of the carriage 13 can be specified by using an internal timer of the control unit 15, and a configuration is simplified and reduced in size compared with, for example, a case where the position of the carriage 13 is detected by a position sensor or a distance sensor.

In the present embodiment, as described above, the colorimetry process can be performed with high accuracy on the color patch 31 based on the spectrometry result obtained when the area of measurement M is included in the region of the color patch 31. Thus, the calibrator 189 can appropriately update the printing profile data based on the colorimetry result. That is, appropriate color correction can be performed by providing feedback to the printing unit 16 based on the difference between the intensity of color of each color patch printed by the printing unit 16. The difference between the intensity of color of each color patch is based on the calibration print data and the intensity of color of each color patch, which is the actually measured high accuracy colorimetry result. Thus, the color desired by a user can be reproduced with high accuracy.

Second Embodiment

Next, a second embodiment according to the present disclosure will be described. In the description below, the same configuration and processing as in the first embodiment will be designated by the same reference sign, and a description thereof will not be provided or will be simplified.

The first embodiment is illustrated by an example in which the reflectances of the plurality of color patches 31 continuously arranged in the X direction are alternately increased and decreased with respect to the initial wavelength (i.e., the waveform of the output value has a peak or a valley). Meanwhile, the second embodiment is different from the first embodiment in that the direction of positional shifting of the area of measurement M can be detected even if a change in the reflectances of the arranged color patches 31 is not definite with respect to the initial wavelength.

That is, if a change in the reflectances of the color patches 31 arranged in the X direction is not definite, the waveform of the output value may have a continuously increasing (i.e., linearly increasing) or continuously decreasing (i.e., linearly decreasing) output value in addition to a peak signal waveform as in FIGS. 12A and 12B and a valley signal waveform as in FIGS. 13A and 13B. In such a case, if a change in the reflectance of each color patch with respect to the initial wavelength is not recorded in the calibration print data, it is difficult to detect the direction of positional shifting of the area of measurement M by using the method of the first embodiment.

Meanwhile, in the second embodiment, the shifting direction detector 187 detects the direction of positional shifting of the area of measurement M by using the following method.

Figure 15:
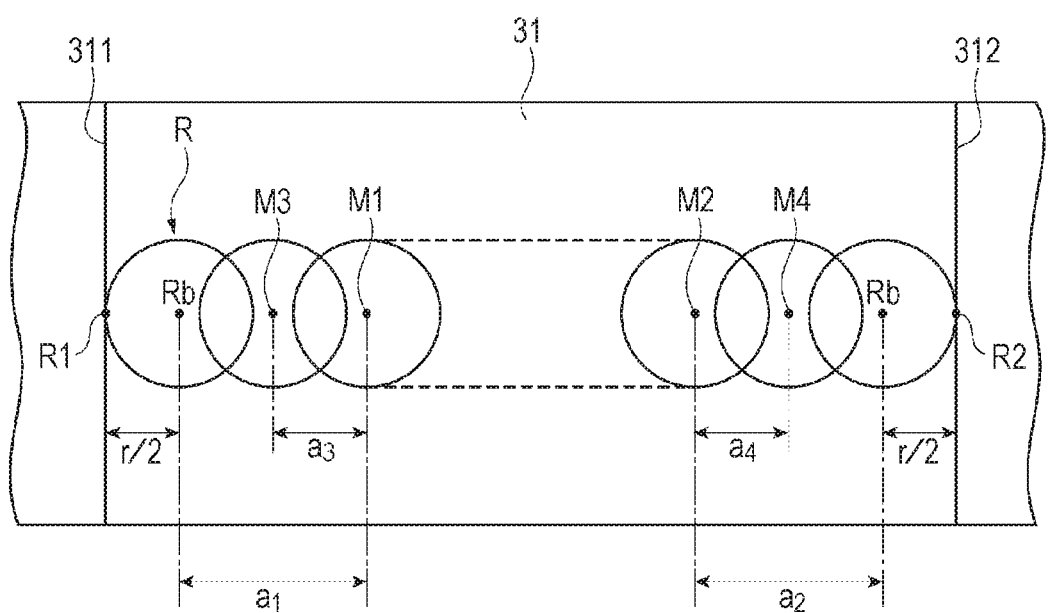
FIG. 15 is a diagram illustrating a shifting direction detecting process in a second embodiment.

FIG. 15 is a diagram illustrating a shifting direction detecting process of the second embodiment.

In the shifting direction detecting process of the present embodiment using light of the initial wavelength in Step S21, a third output value $V_3(i)$ (i.e., third measured value) and a fourth output value $V_4(i)$ (i.e., fourth measured value) are obtained in addition to the first output value $V_1(i)$ and the second output value $V_2(i)$ with respect to the i-th color patch, and the direction of shifting is detected based on these output values.

The third output value $V_3(i)$ is an output value that is output from the light receiver 173 when the measurement target region R is positioned at a predetermined pre-start position M3 before the start position (i.e., M).

The pre-start position M3 is set between the reference point Rb when the entire measurement target region R passes the first patch end portion 311 and the start position M1 if the area of measurement M is set to a normal position. That is, the pre-start position M3 is set to the position separated to the −X side from the start position M1 by a distance $a_3$ (i.e., third distance) that is smaller than the margin $a_1$.

A post-end position M4 is set between the end position M2 and the reference point Rb when the entire measurement target region R reaches the second patch end portion 312 if the area of measurement M is set to a normal position. That is, the post-end position M4 is set to the position separated to the +X side from the end position M2 by a distance $a_4$ (i.e., fourth distance) that is smaller than the margin $a_2$.

Therefore, the measurement range setter 183 sets a measurement pre-start time $T_{m3}(i)$ corresponding to the pre-start position M3 as $T_{m3}(i)=T_{m1}(i)-a_3/v$ and sets a measurement post-end time $T_{m4}(i)$ corresponding to the post-end position M4 as $T_{m4}(i)=T_{m2}(i)+a_4/v$.

Figure 16A:
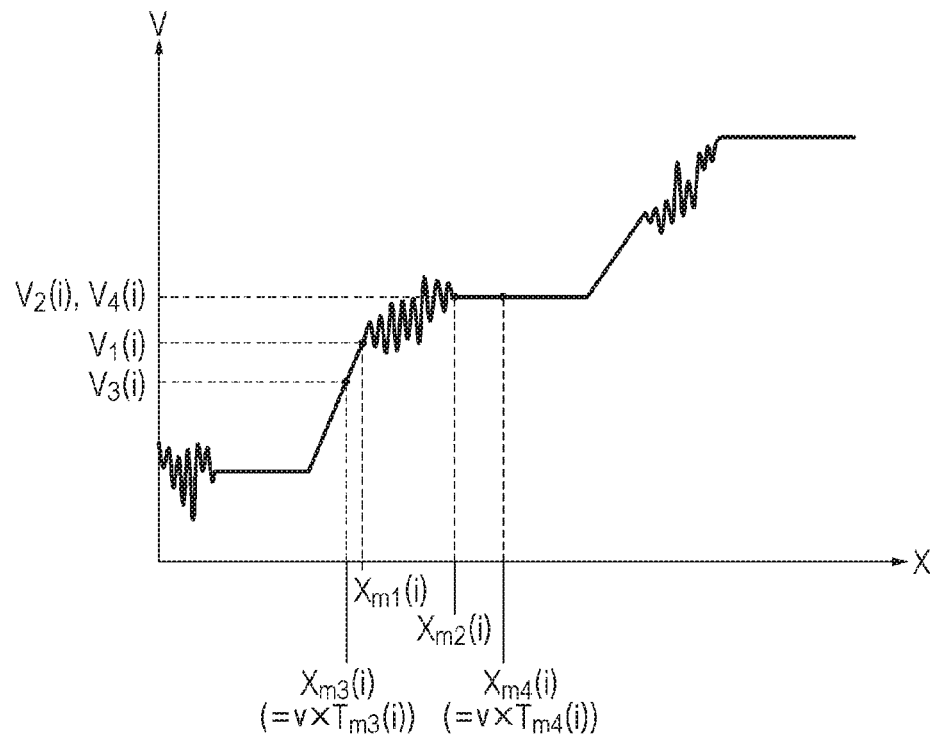
FIGS. 16A and 16B are diagrams illustrating a change in output value with respect to a position of a reference point in a case where the area of measurement is positionally shifted.
Figure 16B:
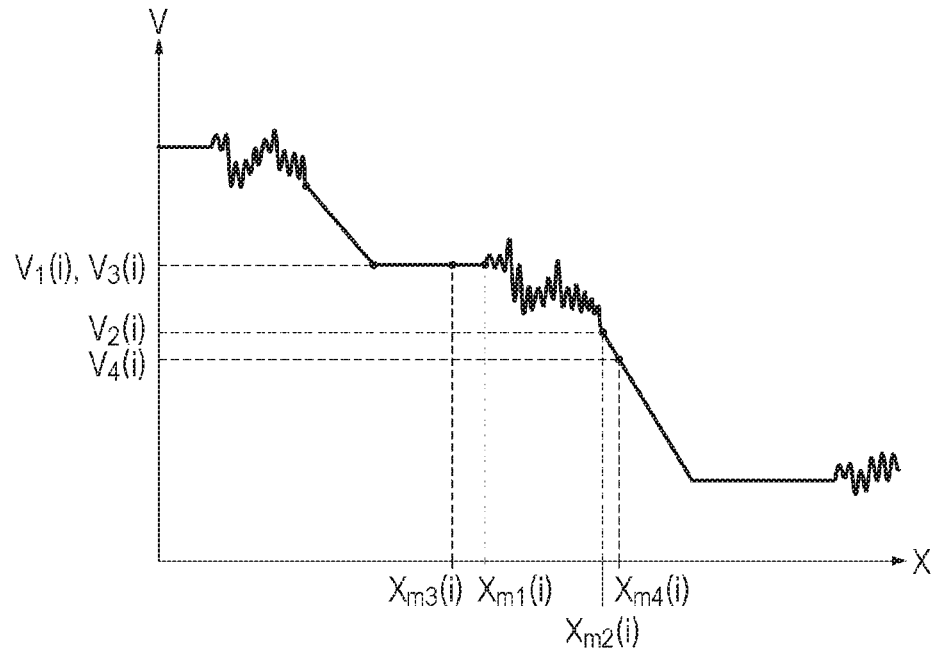

FIGS. 16A and 16B are diagrams illustrating a change in output value with respect to the position of the reference point Rb in a case where the area of measurement M is positionally shifted in the second embodiment. FIG. 16A illustrates a case where the area of measurement M is shifted to the −X side, and FIG. 16B illustrates a case where the area of measurement M is shifted to the +X side.

In the present embodiment, the shifting direction detector 187 determines that the area of measurement M is positionally shifted to the −X side if, as illustrated in FIG. 16A, the absolute value of the difference between the first output value $V_1(i)$ and the third output value $V_3(i)$ is greater than the first threshold and the absolute value of the difference between the second output value $V_2(i)$ and the fourth output value $V_4(i)$ is less than or equal to the first threshold.

The shifting direction detector 187 determines that the area of measurement M is positionally shifted to the +X side if, as illustrated in FIG. 16B, the absolute value of the difference between the first output value $V_1(i)$ and the third output value $V_3(i)$ is less than or equal to the first threshold and the absolute value of the difference between the second output value $V_2(i)$ and the fourth output value $V_4(i)$ is greater than the first threshold.

In the present embodiment, even if a magnitude relationship between the reflectances of adjacent color patches 31 is not definite with respect to the initial wavelength, the direction of positional shifting can be easily determined by obtaining the third output value $V_3(i)$ and the fourth output value $V_4(i)$ with respect to the pre-start position M3 and the post-end position M4 and determining each of a relationship between the first output value $V_1(i)$ and the third output value $V_3(i)$ and a relationship between the second output value $V_2(i)$ and the fourth output value $V_4(i)$.

Third Embodiment

Next, a third embodiment according to the present disclosure will be described.

While the first embodiment and the second embodiment illustrate the measurement target region R as a circular spot having the diameter r, the third embodiment is different from above each embodiment in that the measurement target region R is a rectangular spot.

Above each embodiment assumes that the output value changes approximately linearly when the measurement target region R passes the end portions 311 and 312 of the color patch 31. In this case, measurement error does not occur to the extent affecting the spectrometry process if the area of the measurement target region R is sufficiently small and the speed v of the carriage 13 is sufficiently high.

However, in a case of, for example, obtaining a spectral image of the color patch 31 and measuring the intensity of color considering irregularity or the like in the color of the color patch, light in the measurement target region R having a comparatively large area (e.g., larger than or equal to a predetermined third threshold) is received by the light receiver 173 that is configured of an image sensor, such as a CCD sensor.

Figure 17:
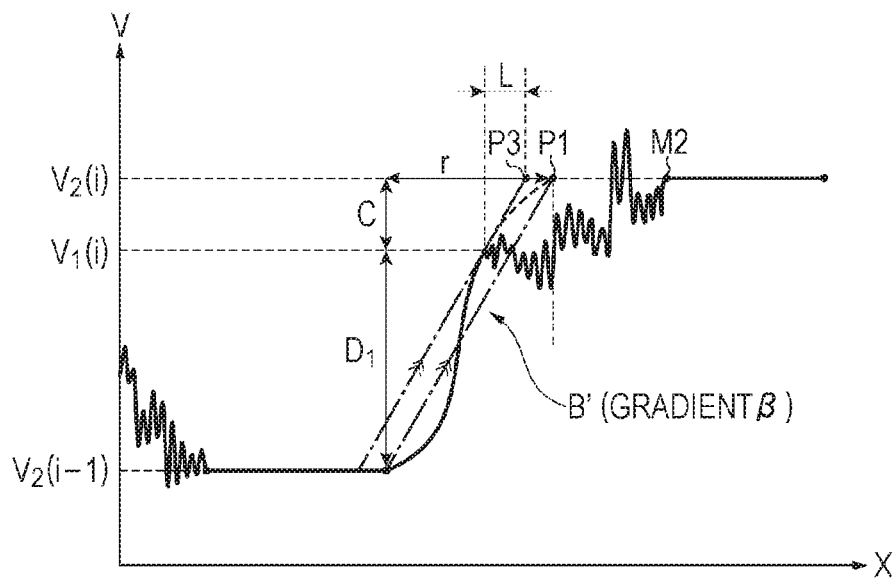
FIG. 17 is a diagram illustrating a change in output value in a case where the area of the measurement target region is large.

In this case, a change in output value is illustrated in FIG. 17.

FIG. 17 is a diagram illustrating a change in output value when the spectrometry process is performed by the spectroscope 17 on the color patch 31 in a case where the diametral dimension of the circular spot measurement target region R is large.

As illustrated in FIG. 17, when the measurement target region R moves to the adjacent color patch 31 in a case where the measurement target region R is a circular spot and has a large area, the waveform of the output value is obtained as a cubic curve having inflection points corresponding to the output values when the center (reference point Rb) of the measurement target region R is positioned on the end portions of the color patch 31.

In this case, if the distance L is calculated from $L=C/\beta$ by calculating the gradient $\beta$ $(=(C+D_1)/r)$ as in the first embodiment, calculated is the distance from the start position M1 to a point P3 before the point P1 (on the −X side of the point P1), not the distance from the start position M1 to the point P1 that is to be originally calculated, and thereby a slight error occurs.

Figure 18:
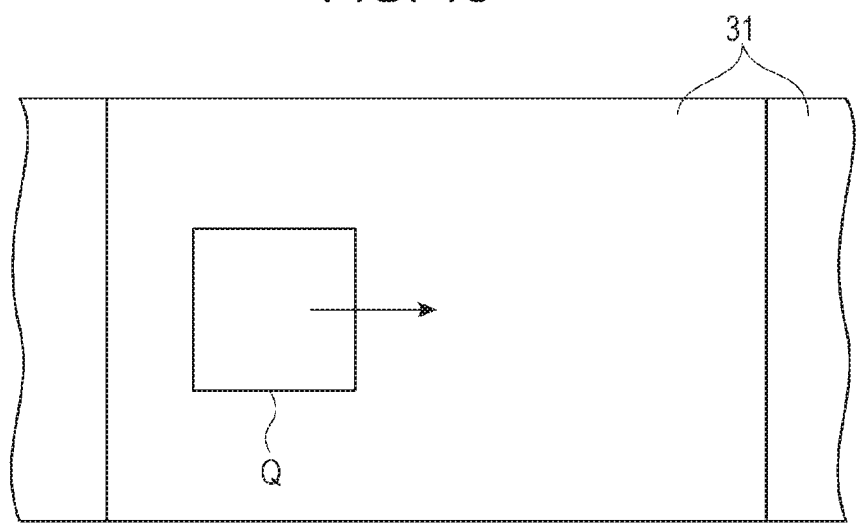
FIG. 18 is a diagram illustrating a measurement target region in a third embodiment.

FIG. 18 is a diagram illustrating a measurement target region Q in the present embodiment.

The measurement target region Q in the present embodiment is a rectangle that has the measurement patch width $W_p$ in the X direction and has two parallel edges in the X direction and two parallel edges in the Y direction which is orthogonal with respect to the X direction.

In a case of using the measurement target region Q having such a shape, even if the area of the measurement target region Q is large, the waveform of a change in output value when the measurement target region Q moves to the adjacent color patch 31 across the end portions 311 and 312 of the color patch 31 is linear as in the first embodiment. Therefore, the amount of shifting can be calculated with high accuracy by using the same method as the first embodiment.

As a configuration for the measurement target region Q having a rectangular measurement spot, a rectangular aperture is disposed in, for example, the light guide 174; in the glass substrate 62 or the cover glass 63 of the optical filter device 172; between the optical filter device 172 and the light receiver 173; on the light incident face of the light receiver 173; or on the surfaces of the substrates 51 and 52 of the wavelength-selective interference filter 5 in the spectroscope 17. Accordingly, of the incident light, the light receiver 173 receives only light in the rectangular measurement target region Q that passes through the aperture. It is also possible to use a configuration that uses a rectangular reflecting mirror 174A around which, for example, a black frame is disposed.

MODIFICATION EXAMPLES

The present disclosure is not limited to each embodiment described above. Modifications, improvements, and configurations obtained by an appropriate combination of each embodiment to the extent capable of achieving the advantage of the present disclosure are to be included in the present disclosure.

Modification Example 1

While the carriage moving unit 14 that moves the carriage 13 in the +X direction is illustrated as a moving unit of the present disclosure in above each embodiment, the present disclosure is not limited to this.

For example, a configuration that fixes the carriage 13 and moves the medium A with respect to the carriage 13 may be used. In this case, vibration of the wavelength-selective interference filter 5 accompanied by movement of the carriage 13 can be suppressed, and the transmitted wavelength of the wavelength-selective interference filter 5 can be stabilized.

While the plurality of color patches 31 arranged in the X direction is illustrated as being scanned with the measurement target region R in the X direction, the color patches 31 may be scanned with the measurement target region R in the Y direction. In this case, the measurement target region R can be relatively moved with respect to the color patches 31 by feeding the medium A in the Y direction using the transport unit 12. Since the one direction (scanning direction) of the present disclosure corresponds to the Y direction in this case, the measurement range setter 183 sets the area of measurement M in the Y direction with respect to the color patches 31. That is, the measurement start time and the measurement end time may be set for each color patch 31 based on the speed v of paper feeding performed by the transport unit 12.

Modification Example 2

While each embodiment illustrates the color patch group 30 in which the plurality of color patches 31 is adjacently arranged in the X direction, a configuration in which a gap is disposed between each color patch 31 may be used. In this case, if the medium A is a white paper, the signal waveform of the output value in the color patches 31 corresponds to a peak waveform when scanning is performed with the carriage 13 in the X direction with the wavelength of light transmitted through the wavelength-selective interference filter 5 fixed to the initial wavelength. If the medium A is a black paper or if a black frame is arranged between the color patches 31, the signal waveform of the output value in the color patches 31 corresponds to a valley waveform. Therefore, even if the reflectance of each color patch 31 is not definite with respect to the initial waveform, the direction of positional shifting can be easily detected by the method of the first embodiment.

While each embodiment illustrates the color chart 3 in which the plurality of color patches 31 is arranged, only one color patch 31, for example, may be arranged, and the colorimetry process may be performed on the color patch 31.

Modification Example 3

While each embodiment illustrates the spectrometry process as being performed on each color patch 31 while the carriage 13 is moved to the +X side, the spectrometry process may be performed on each color patch 31 while the carriage 13 is moved to the −X side.

Alternatively, the spectrometry process may be performed on the odd row color patch groups 30 arranged in the color chart 3 while the carriage 13 is moved to the +X side, and the spectrometry process may be performed on the even row color patch groups 30 while the carriage 13 is moved to the −X side.

In this case, if the color chart 3 has line symmetry on an imaginary line passing through the center of the area of movement of the carriage 13 and parallel to the Y direction and the patch width $W_p$ of each color patch is the same, the measurement start time $T_{m1}(i)$ and the measurement end time $T_{m2}(i)$ in a case of moving the carriage 13 to the +X side can be applied to the measurement start time $T_{m1}(i)$ and the measurement end time $T_{m2}(i)$ in a case of moving the carriage 13 to the −X side. If the patch width $W_p$ is different for each color patch in each color patch group 30 in the color chart 3 or if the color chart 3 does not have line symmetry on the imaginary line, each of the measurement start time $T_{m1}(i)$ and the measurement end time $T_{m2}(i)$ is set when the measurement target region R is moved from the goal bar 33 to the −X side.

Modification Example 4

While, in each embodiment, the color patch 31 in which the first output value $V_1(i)$ and the second output value $V_2(i)$ are greater than or equal to the second threshold is selected and positional shifting of the area of measurement M is determined based on the output value in the selected color patch 31 in Step S13, the present disclosure is not limited to this. For example, positional shifting of the area of measurement M may be determined based on the first output value $V_1(i)$ and the second output value $V_2(i)$ in all color patches 31.

Modification Example 5

While the margins $a_1$ and $a_2$ are set at the time of setting the area of measurement M in each embodiment, the present disclosure is not limited to this.

For example, the measurement range setter 183 may set the area of measurement M without disposing margins. In this case, the start position M1 corresponds to the position at which the first patch end portion 311 overlaps with the first measurement region end portion R1 (e.g., immediately after the measurement target region R enters the region of the color patch 31), and the end position M2 corresponds to the position at which the second patch end portion 312 overlaps with the second measurement region end portion R2 (e.g., immediately before the measurement target region R passes outside of the color patch 31). If such an area of measurement M is set, the measurement distance $W_m$ can be set to a long distance, the amount of time for detecting light of one wavelength can be increased, and the intensity of transmitted light can be obtained in a state where vibration of the movable portion 521 at the time of driving the wavelength-selective interference filter 5 is securely stationary. Thus, the spectrometry process can be performed with high accuracy in a case where the area of measurement M is not positionally shifted, and accordingly, the accuracy of the spectrometry process performed on the color patches 31 can be improved.

If the measurement distance $W_m$ is fixed (i.e., the number of bands n and the filter drive time $T_n$ are fixed), the patch width $W_p$ of the color patch 31 can be decreased, and more color patches 31 can be arranged in one row of the color patch group 30.

Modification Example 6

While, in each embodiment, the measurement range setter 183 sets the margins $a_1$ and $a_2$ based on the patch width $W_p$ of the color patch 31, the diametral dimension r of the measurement target region R, the number of measurement bands n in the area of measurement M, and the filter drive time $T_n$ necessary for performing spectrometry once, and then sets the measurement start time $T_{m1}(i)$ and the measurement end time $T_{m2}(i)$ with respect to the start position M1 and the end position M2, the present disclosure is not limited to this.

For example, the margins $a_1$ and $a_2$ may be set in advance with respect to the color patches 31.

Alternatively, scanning may be performed with the carriage 13 in a state where the wavelength of light transmitted through the wavelength-selective interference filter 5 is fixed to the initial wavelength, the patch width $W_p$ of the color patch 31 may be calculated based on the waveform of the output value from the light receiver 173, and the margins $a_1$ and $a_2$ may be set based on the calculated patch width $W_p$.

Furthermore, in this case, a determination of whether the calculated patch width $W_p$ has a sufficient dimension in order to set the margins $a_1$ and $a_2$ sufficiently larger than or equal to a predetermined value or a determination of whether the measurement distance $W_m$ of the area of measurement M has a sufficient dimension for performing spectrometry in n bands may be performed. If the dimension of the margin or the measurement distance $W_m$ is determined to be insufficient, the number of times colorimetry is performed in the area of measurement M (i.e., number of bands n) may be, for example, decreased.

Modification Example 7

While, in each embodiment, the measurement range setter 183 sets the reference position to the position at which the measurement target region R passes the start bar 32 and sets the measurement start time and the measurement end time respectively to the times necessary for movement of the measurement target region R from the reference position to the start position M1 and to the end position M2, the present disclosure is not limited to this.

For example, the reference position may be set to an initial position where the carriage 13 is positioned in the −X side end portion, and the measurement start time and the measurement end time in the area of measurement M may be set for each color patch 31 from the initial position.

Modification Example 8

Alternatively, the measurement start time and the measurement end time for each color patch 31 may be set with the timing, as a reference, at which the entire measurement target region R passes the second patch end portion 312 of the previous arranged color patch 31.

That is, if scanning is performed with the carriage in the X direction in a state where the wavelength of light transmitted through the wavelength-selective interference filter 5 is fixed to the initial wavelength, the signal waveform of the output value changes to an approximately linear form while the measurement target region R moves across the end portion 311 (312) of the color patch 31, and the output value becomes approximately constant if the measurement target region R completely enters the region of the color patch 31. Therefore, the timing at which the output value becomes constant may be detected, and the start position M1 and the end position M2 may be determined by the amount of time elapsing from the timing.

In this case, the measurement range setter 183 sets the measurement start time $T_{m1}$ as $T_{m1}=a_1/v$ since the start position corresponds to the position to which the measurement target region R advances by the margin $a_1$. The measurement end time $T_{m2}$ is calculated from $T_{m2}=T_{m1}+W_m/v$ with the width dimension of the area of measurement M as $W_m$.

If such a measurement start time and a measurement end time are set, the area of measurement M is not positionally shifted in all of the plurality of color patches 31. Therefore, the spectrometry result with respect to all color patches 31 can be easily obtained by performing measurement again on a part of the color patches 31 where error is detected, and the amount of measurement time can be decreased.

Modification Example 9

While the amount of shifting and the direction of shifting at the time of positional shifting of the area of measurement M are obtained by the shifting amount calculator 186 and the shifting direction detector 187 in above each embodiment, the present disclosure is not limited to this.

For example, if the area of measurement M is determined not to be included within the region of the color patch 31, the area of measurement M may be set to an appropriate position by repeating the process of resetting the area of measurement M with changing the position thereof by a minute amount at a time in a predetermined direction using the measurement range setter 183 and performing spectrometry again.

Alternatively, a configuration in which only the shifting amount calculator 186 is disposed while the shifting direction detector 187 is not disposed may be used. In this case, if the area of measurement M is determined not to be included in the region of the color patch 31, the measurement range setter 183 moves the area of measurement M by, for example, an amount of correction corresponding to the amount of shifting to the +X side, and spectrometry is performed again. If the area of measurement M is again determined to be positionally shifted, the measurement range setter 183 moves the area of measurement M by, for example, an amount of correction corresponding to the amount of shifting to the −X side. Accordingly, even if the direction of positional shifting is not known, the area of measurement M can be set to an appropriate position.

Further alternatively, a configuration in which only the shifting direction detector 187 is disposed while the shifting amount calculator 186 is not disposed may be used. In this case, if the area of measurement M is determined not to be included in the region of the color patch 31, the measurement range setter 183 moves the area of measurement M by a minute amount (for example, a smaller amount than the margins $a_1$ and $a_2$) in the opposite direction from the detected direction of positional shifting, and spectrometry is performed again. If the area of measurement M is again determined to be positionally shifted, the area of measurement M is again moved by a minute amount. By repeating this process, the area of measurement M can be set to an appropriate position even if the amount of positional shifting is not known.

Modification Example 10

While the measurement range setter 183 calculates the measurement start time and the measurement end time from the reference position in above each embodiment, the present disclosure is not limited to this.

For example, the position of the carriage 13 (i.e., position of the measurement target region R) in the X direction may be detected by a position sensor or based on the angle of rotation and the number of rotations of a drive motor of the carriage moving unit 14. In this case, the measurement range setter 183 may set the positions of the start position M1 and the end position M2 with respect to each color patch 31, and the filter controller 184 may control the voltage applied to the electrostatic actuator 56 based on the detected position.

Modification Example 11

While the determiner 185 determines whether the area of measurement M is appropriate based on the output value from the light receiver 173 in above each embodiment, a determination of whether the area of measurement M is appropriate may be performed based on, for example, the reflectance calculated, which is based on spectrometry ($V_1(i)/V_{ref}(\lambda)$ and $V_2(i)/V_{ref}(\lambda)$).

Modification Example 12

While each embodiment illustrates the filter controller 184 as setting the initial wavelength as the first wavelength at the start of measurement and at the end of measurement in the area of measurement M, the present disclosure is not limited to this.

For example, a predetermined first wavelength (e.g., 400 nm) that is different from the initial wavelength may be set at the start of measurement and at the end of measurement in the area of measurement M. In this case, the set first wavelength is also set in the period of time from the measurement end time $T_{m2}(i)$ with respect to the i-th color patch 31 to the measurement start time $T_{m1}(i+1)$ with respect to the (i+1)-th color patch 31.

While each embodiment illustrates setting of the initial wavelength by application of the initial drive voltage at the start of measurement and at the end of measurement, the wavelength of light transmitted through the wavelength-selective interference filter 5 may be set as the first wavelength, for example, in a state where a voltage is not applied to the electrostatic actuator 56.

Modification Example 13

While a configuration in which the unit controller circuit 152 is disposed in the control unit 15 is illustrated, a control unit may be disposed in each unit separately from the control unit 15 as described above. For example, a filter controller circuit that controls the wavelength-selective interference filter 5 and a light reception controller circuit that controls the light receiver 173 may be disposed in the spectroscope 17. Alternatively, a microcomputer and a memory storing the V–λ data may be incorporated into the spectroscope 17, and the microcomputer may function as the filter controller 184, the determiner 185, and the color measurer 188.

Modification Example 14

While the printing unit 16 is illustrated as an ink jet type that discharges ink supplied from the ink tank by driving the piezoelectric element, the present disclosure is not limited to this. For example, the printing unit 16 may discharge ink by generating an air bubble in the ink using a heater or may discharge ink by using an ultrasonic vibrator.

This is not limited to an ink jet type and, for example, can be applied to a printer of any printing type, such as a thermal printer using thermal transfer, a laser printer, and a dot impact printer.

Modification Example 15

While the spectroscope 17 is illustrated by a configuration in which the medium A is irradiated with light from the light source unit 171 in the direction of a line normal to the medium A and the light guide 174 causes light reflected by the medium A at 45° to be incident on the wavelength-selective interference filter 5, the present disclosure is not limited to this.

For example, light may be incident on the surface of the medium A at an angle of 45°, and the light receiver 173 may receive light that is reflected by the medium A in the direction of a line normal to the medium A through the wavelength-selective interference filter 5.

While the light receiver 173 receives light reflected by the medium A at 45° through the wavelength-selective interference filter 5, the light receiver 173 may receive light that is reflected at an angle other than 45° such as 30°. That is, the angle of the optical axis of the light receiver 173 and the wavelength-selective interference filter 5 may be set in such a manner that the light receiver 173 does not receive light that is reflected by the medium A in a specular manner.

Modification Example 16

While, in each embodiment, for convenience of description, the measurement start time $T_{m1}(i)$ and the measurement end time $T_{m2}(i)$ are set by disposing the color patches 31 in the section in which the carriage 13 moves in a uniform linear motion, the present disclosure is not limited to this.

For example, the color patches 31 may be disposed near the initial position on the medium A. That is, the color patches 31 may be arranged in the section in which the carriage 13 moves in an accelerated motion from the initial position. In this case, the measurement range setter 183 sets the measurement start time $T_{m1}(i)$ and the measurement end time $T_{m2}(i)$ with respect to the color patches 31 in each of the period of the accelerated motion of the carriage 13 and the period of the uniform motion thereof.

If the carriage 13 does not move in a uniform linear motion after passing the start bar 32 and the speed of the carriage 13 changes in a predetermined speed pattern, the measurement start time $T_{m1}(i)$ and the measurement end time $T_{m2}(i)$ in the area of measurement M may be obtained based on the speed pattern.

Modification Example 17

While the third embodiment illustrates a configuration in which an aperture is disposed in the spectroscope 17 to make the measurement target region R rectangular or a configuration in which the reflecting mirror 174A is formed to be rectangular if the area of measurement target region R is large, the present disclosure is not limited to this.

For example, based on a change in the signal of the output value from the light receiver 173 (e.g., a curved part B' in FIG. 17) when the measurement target region R moves across the end portions 311 and 312 of the color patch 31, the curve may be approximated to a polynomial, and the amount of shifting (i.e., distance L from the point M1 to the point P1+margin $a_1$) may be calculated based on the polynomial resulting from approximation.

Modification Example 18

While the wavelength-selective interference filter 5 is illustrated as a light transmitting type that transmits light of a wavelength corresponding to the gap G between the reflecting films 54 and 55 from incident light, the present disclosure is not limited to this. For example, a light reflecting wavelength-selective interference filter that reflects light of a wavelength corresponding to the gap G between the reflecting films 54 and 55 may be used. In addition, other types of wavelength-selective interference filters may be used.

Modification Example 19

While the optical filter device 172 in which the wavelength-selective interference filter 5 is accommodated in the casing 6 is illustrated, the wavelength-selective interference filter 5 may be directly disposed in the spectroscope 17, for example.

Modification Example 20

While the optical filter device 172 that includes the wavelength-selective interference filter 5 is illustrated as being disposed between the light guide 174 and the light receiver 173 (i.e., post-dispersive spectroscopy), the present disclosure is not limited to this.

For example, the wavelength-selective interference filter 5 or the optical filter device 172 including the wavelength-selective interference filter 5 may be arranged in the light source unit 171, and the medium A may be irradiated with light that is spectroscopically analyzed by the wavelength-selective interference filter 5 (i.e., pre-dispersive spectroscopy).

Modification Example 21

While each embodiment illustrates the printer 10 as including the spectrometry device, the present disclosure is not limited to this. For example, the spectrometry device may not include an image forming unit and perform only the colorimetry process on the medium A. The spectrometry device may be incorporated into, for example, a quality inspecting apparatus that inspects the quality of a printed matter manufactured in a factory or the like. Alternatively, the spectrometry device of the present disclosure may be incorporated into any suitable apparatus.

Modification Example 22

The measurement target is not limited to the color patch and may be an arbitrary substance.

The present disclosure can be applied to, for example, a spectroscope that detects a foreign object in a moving food mounted on a conveyor belt. In a case of detecting an organic matter as a foreign object, it is preferable to use a spectroscope that spectroscopically analyzes light from near-infrared light to mid-infrared light.

Modification Example 23

It is obvious that the present disclosure is preferably applied while the measurement target and the spectroscope relatively moves. In addition, the present disclosure can be applied when the measurement target and the spectroscope does not relatively move or when the measurement target and the spectroscope relatively move in an intermittent manner.

For example, obtaining the first measured value measured at a first time and the second measured value measured at a second time from the same position in the measurement target or obtaining the first measured value in a state where the measurement target and the spectroscope does not relatively move and the second measured value in a state where the measurement target and spectroscope relatively move also falls within the application range of the present disclosure.

Besides, a specific structure in embodying the present disclosure may be configured by appropriately combining above each embodiment and the modification examples to the extent capable of achieving the advantage of the present disclosure and may be appropriately changed to other structures and the like.

The entire disclosure of Japanese Patent Application Nos. 2015-041728 filed Mar. 3, 2015 and 2016-020034 filed Feb. 4, 2016 are expressly incorporated by reference herein.

What is claimed is:

1. A spectrometry device comprising:
a spectroscope that measures a measured value of light; and
a moving mechanism that moves the spectroscope relative to a measured target,
wherein the spectroscope is configured to measure:
a first measured value of light at a first wavelength at a first time;
a second measured value of light at a second wavelength at a second time; and
a third measured value of light at the first wavelength at a third time, and
wherein the first measured value is compared with the third measured value.

2. A spectrometry device comprising:
a spectroscope that includes a wavelength-selective interference filter on which light from a measurement target is incident, wherein the spectroscope is configured perform spectrometry on the measurement target; and
a moving mechanism that moves the spectroscope relative to the measurement target in one direction, wherein:
when the measurement target is a color patch, the spectroscope changes a wavelength of light passed by the wavelength-selective interference filter in a first period during which the spectroscope is relatively moved in the one direction, the wavelength-selective interference filter passes light of a first wavelength at a start of measurement and at an end of measurement in the first period, and a first measured value that is a measured value from the spectrometry at the start of measurement is compared with a second measured value that is a measured value from the spectrometry at the end of measurement.

3. The spectrometry device according to claim 1, wherein:
the difference between the first measured value and the second measured value is compared with a first threshold to determine if the difference is less than or equal to the first threshold.

4. The spectrometry device according to claim 2, wherein:
the spectroscope includes a light receiver that receives light emitted from the wavelength-selective interference filter, and
the first measured value is compared with the second measured value by using an output value from the light receiver.

5. The spectrometry device according to claim 2, further comprising:
a control unit that controls the spectroscope and the moving mechanism.

6. The spectrometry device according to claim 5, wherein:
the control unit includes a filter controller that changes a wavelength of light passing through the wavelength-selective interference filter.

7. The spectrometry device according to claim 2, wherein:
the spectroscope performs spectrometry on a plurality of the color patches arranged in the one direction, the color patch in which the measured value is greater than or equal to a second threshold is selected, and the first measured value and the second measured value of the selected color patch are compared with each other.

8. The spectrometry device according to claim 2, wherein:
a first position is a position of the spectroscope at the time of measuring the first measured value,
a second position is a position of the spectroscope at the time of measuring the second measured value,
a difference between the first measured value and the second measured value is compared to a first threshold, and
when the difference between the first measured value and the second measured value is greater than the first threshold, a direction in which the first position and the second position are shifted from the first position and the second position at the time of the spectrometry performed within the region of the color patch is detected.

9. The spectrometry device according to claim 8, wherein:
the direction of the shift is detected based on the first measured value, the second measured value, a third measured value, and a fourth measured value,
the third measured value is a measured value before the first period at the time of performing the spectrometry with light of the first wavelength by relatively moving the spectroscope in the one direction, and
the fourth measured value is a measured value after the first period at the time of performing the spectrometry with light of the first wavelength by relatively moving the spectroscope in the one direction.

10. The spectrometry device according to claim 8, wherein:
the direction of the shift is detected based on a reflectance of a color around the color patch with respect to the first wavelength, the first measured value, and the second measured value.

11. The spectrometry device according to claim 2, wherein:
the difference between the first measured value and the second measured value is compared to a first threshold, and
when the difference between the first measured value and the second measured value is greater than the first threshold, an amount of shifting by which a first position and a second position are shifted from the first position and the second position at the time of the spectrometry performed within the region of the color patch is calculated, wherein the first position is a position of the spectroscope at the time of measuring the first measured value, and the second position is a position of the spectroscope at the time of measuring the second measured value.

12. The spectrometry device according to claim 11, wherein:
the amount of shifting is calculated based on the first measured value and the second measured value with respect to two or more of the color patches continuously arranged.

13. The spectrometry device according to claim 2, wherein:
the moving mechanism moves the spectroscope in the one direction at a uniform speed.

14. An image forming apparatus comprising:
the spectrometry device according to claim 1; and
an image forming unit that forms an image on an image formation target.

15. An image forming apparatus comprising:
the spectrometry device according to claim 2; and
an image forming unit that forms an image on an image formation target.

16. An image forming apparatus comprising:
the spectrometry device according to claim 3; and
an image forming unit that forms an image on an image formation target.

17. An image forming apparatus comprising:
the spectrometry device according to claim 4; and
an image forming unit that forms an image on an image formation target.

18. An image forming apparatus comprising:
the spectrometry device according to claim 5; and
an image forming unit that forms an image on an image formation target.

19. A spectrometry method comprising:
providing a spectroscope that is configured to move relative to a measurement target;
measuring a first measured value of light at a first wavelength at a first time using the spectroscope;
measuring a second measured value of light at a second wavelength at a second time using the spectroscope;
measuring a third measured value of light at the first wavelength at a third time using the spectroscope; and
comparing the first measured value with the third measured value.

20. A spectrometry method that performs spectrometry on a color patch as a measurement target by using a spectrometry device that includes a spectroscope, the spectroscope includes a wavelength-selective interference filter on which light from the measurement target is incident and a moving mechanism that moves the spectroscope relative to the measurement target in one direction, the method comprising:
relatively moving the spectroscope in the one direction;
performing spectrometry by changing a wavelength of light passing through the wavelength-selective interference filter in a first period during which the spectroscope is relatively moved;
passing light of a first wavelength through the wavelength-selective interference filter at a start of measurement and at an end of measurement in the first period; and
comparing a first measured value that is a measured value from the spectrometry at the start of measurement with a second measured value that is a measured value from the spectrometry at the end of measurement.

* * * * *